US011644961B1

(12) United States Patent
Brdiczka et al.

(10) Patent No.: US 11,644,961 B1
(45) Date of Patent: May 9, 2023

(54) UTILIZING A TRANSFORMER-BASED GENERATIVE LANGUAGE MODEL TO GENERATE DIGITAL DESIGN DOCUMENT VARIATIONS

(71) Applicant: Adobe Inc., San Jose, CA (US)

(72) Inventors: Oliver Brdiczka, San Jose, CA (US); Alexandru Vasile Costin, Monte Sereno, CA (US); Ionut Mironica, Bucharest (RO); Vlad-Constantin Lungu-Stan, Buzau (RO)

(73) Assignee: Adobe Inc., San Jose, CA (US)

( * ) Notice: Subject to any disclaimer, the term of this patent is extended or adjusted under 35 U.S.C. 154(b) by 0 days.

(21) Appl. No.: 17/652,044

(22) Filed: Feb. 22, 2022

(51) Int. Cl.
- *G06Q 30/02* (2012.01)
- *G06F 3/04845* (2022.01)
- *G06F 40/106* (2020.01)
- *G06F 40/284* (2020.01)
- *G06T 7/60* (2017.01)

(52) U.S. Cl.
CPC ........ *G06F 3/04845* (2013.01); *G06F 40/106* (2020.01); *G06F 40/284* (2020.01); *G06T 7/60* (2013.01)

(58) Field of Classification Search
CPC .. G06F 3/04845; G06F 40/106; G06F 40/284; G06T 7/60
See application file for complete search history.

(56) References Cited

U.S. PATENT DOCUMENTS

2019/0311399 A1\* 10/2019 Liu .................... G06Q 30/0244

OTHER PUBLICATIONS

H. Sing, G. Verma, and B. Srinivasan in Incorporating Stylistic Lexical Preferences in Generative Language Models, Findings of the Association for Computational Linguistics: EMNLP 2020, 1074-1079 (2020).

A. Radford, K. Narsimhan, T. Salimans, and H. Sutskever in Improving Language Understanding by Generative Pre-Training (2018).

\* cited by examiner

*Primary Examiner* — Hassan Mrabi
(74) *Attorney, Agent, or Firm* — Keller Preece PLLC

(57) ABSTRACT

The present disclosure relates to systems, non-transitory computer-readable media, and methods for utilizing a design language model and a generative language model to generate digital design documents with design variations. In particular embodiments, the disclosed systems implement the design language model to tokenize the design of a document into a sequence of language tokens. For example, the disclosed systems tokenize visual elements and a layout of the document—in addition to optional user-added content. The generative language model utilizes the sequence of language tokens to predict a next language token representing a suggested design variation. Based on the predicted language token, the disclosed systems generate a modified digital design document visually portraying the suggested design variation. Further, in one or more embodiments, the disclosed systems perform iterative refinements to the modified digital design document.

20 Claims, 20 Drawing Sheets

UTILIZING A TRANSFORMER-BASED GENERATIVE LANGUAGE MODEL TO GENERATE DIGITAL DESIGN DOCUMENT VARIATIONS

BACKGROUND

Recent years have seen significant advancement in hardware and software platforms for generating and editing digital designs. In particular, conventional systems have leveraged advancements in computer technology to help aid clients and client devices to create digital design content. For example, some conventional systems provide low-level asset recommendations, such as image or font recommendations, in generating digital design documents. Unfortunately, these conventional systems continue to suffer from a number of technical problems. For example, certain conventional systems implement rigid design frameworks that hinder system flexibility to create digital designs. In addition, some conventional systems generate digital designs with reduced accuracy or efficacy. Moreover, some conventional systems inefficiently utilize computing resources and increase computational overhead in processing of user interactions to remedy inaccurate or ill-fitting digital design components.

To illustrate, certain conventional systems implement an overly rigid rule-based approach to design modifications. As mentioned, some conventional systems provide limited suggestions such as a limited set of shapes and colors from predefined options. Such systems follows a strict set of design rules and predefined settings that limit flexibility in generating and suggesting design elements.

In addition, conventional systems generate digital designs with reduced accuracy and efficacy. For example, some conventional systems implement simple asset recommendations such as image, font, or color variations. However, these simple asset recommendations do not account for dependencies between several design elements. For instance, conventional systems do not account for visual connections between design elements (e.g., between colors, fonts, and images). This often leads to a combination of design elements that visually clash or impart harsh, undesired effects.

Furthermore, some conventional systems have adopted processing approaches that contribute to system inefficiencies. Indeed, conventional systems often utilize inefficient recommendation algorithms that require significant computational overhead to implement or to remedy the foregoing problems. For example, some conventional systems do not persist user edits or cannot adequately represent user intent in a recommended design modification. Accordingly, some conventional systems increase the computing resources (e.g., memory and processing power) needed to manipulate or generate revised versions of digital design documents based on a multiplicity of time, processed user interactions, and rendered interface elements responsive to the user interactions.

BRIEF SUMMARY

Embodiments of the present disclosure provide benefits and/or solve one or more of the foregoing or other problems in the art with systems, non-transitory computer-readable media, and methods for utilizing a generative language model to generate digital design documents with design variations. In particular embodiments, the disclosed systems implement a language abstraction model to tokenize the design of a document into a sequence of language tokens. For example, the disclosed systems tokenize visual elements of the layout of a document and optional user-selected content into a design language representation. The generative language model learns, based on these sequences of language, to model the design space. Using incomplete sequences of language tokens, the model predicts the remaining language tokens, obtaining a suggested design variation. Based on the predicted language token sequence, the disclosed systems generate a modified digital design document visually portraying the suggested design variation. Further, in one or more embodiments, the disclosed systems perform iterative refinements to the modified digital design document. For example, as part of an iterative creation process, the disclosed systems suggest alternatives to the current design or create new designs from scratch.

Additional features and advantages of one or more embodiments of the present disclosure are outlined in the following description.

BRIEF DESCRIPTION OF THE DRAWINGS

The detailed description provides one or more embodiments with additional specificity and detail through the use of the accompanying drawings, as briefly described below.

DETAILED DESCRIPTION

Figure 1:
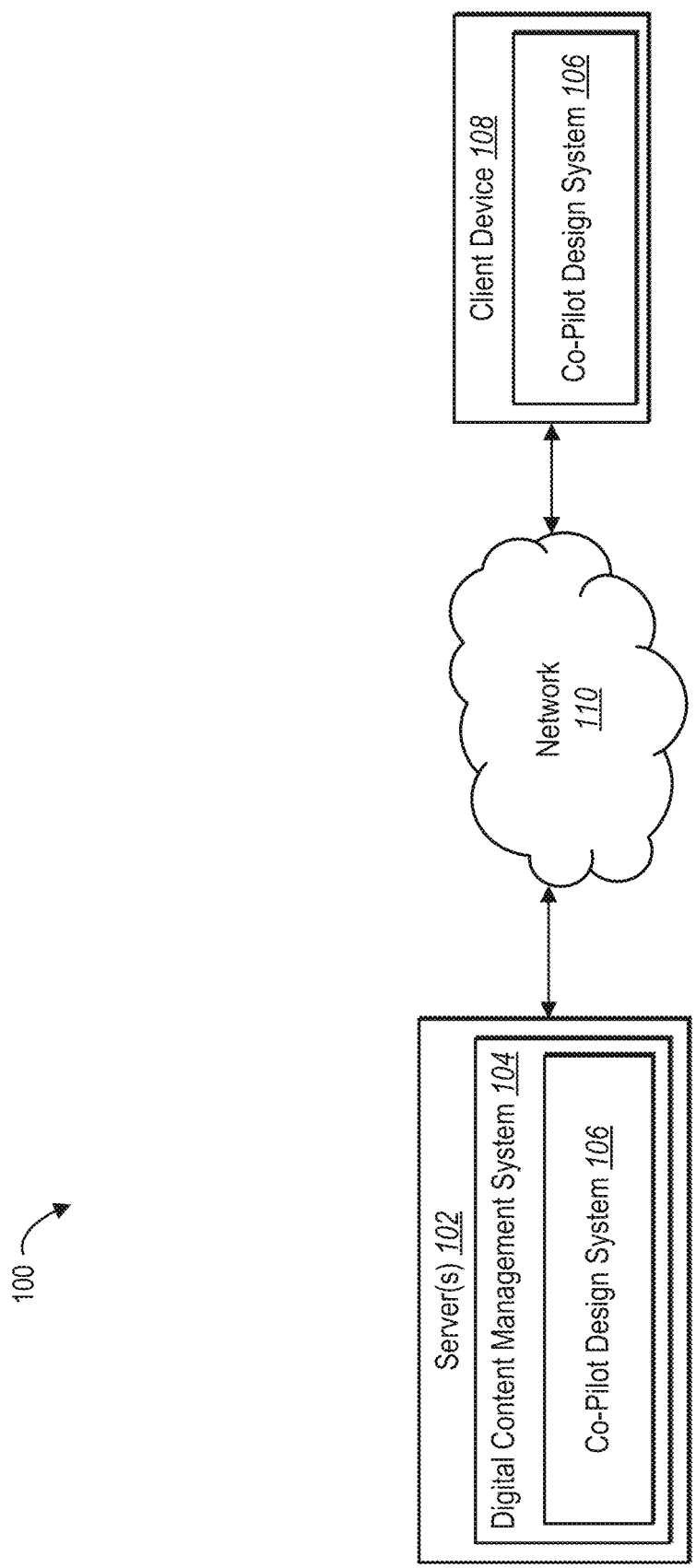
FIG. 1 illustrates a computing system environment for implementing a co-pilot design system in accordance with one or more embodiments.

One or more embodiments described herein include a co-pilot design system that implements a language abstraction model to tokenize document designs and a generative language model to predict tokenized design variations. For example, in one or more implementations, the co-pilot design system starts from an empty canvas or a draft document to generate sequences of recommendations and associated variations that are tailored to user intent. In some embodiments, these recommendations and associated variations include a next design step or the next several design steps. To do so, in particular embodiments, the co-pilot design system identifies a digital design document (e.g., a draft template, natural image, or empty canvas) selected by a user via a graphical user interface. In response to identifying the digital design document, the co-pilot design system leverages a design language representation vocabulary to tokenize elements of the digital design document into a design language representation (e.g., a sequence of language tokens). Based on the design language representation, the co-pilot design system utilizes the generative language model to generate an additional design language representation of one or more new design elements (e.g., an image, shape, text, object, face) or corresponding attributes. In one or more embodiments, the co-pilot design system renders an additional digital design document by decoding the additional design language representation.

To illustrate, in one or more embodiments, the co-pilot design system translates a digital design document to a design language representation utilizing a language abstraction model. For example, the co-pilot design system identifies template information by extracting design elements layer-by-layer from a digital design document. Specifically, the co-pilot design system extracts template metadata (e.g., for objects and faces)—in addition to one or more design elements comprising an image, shape, or text. Further, in some embodiments, the co-pilot design system extracts copyspace information (e.g., regions of the background image of no interest and where there are no design elements in place).

In addition, the co-pilot design system determines attributes and associated attribute values for the extracted design elements. These attributes and associated attribute values define the metes and bounds, qualities, characteristics, and other aspects of the extracted design elements. For instance, the co-pilot design system determines attribute values for one or more element attributes—including element attributes of frame, opacity, filter, blur, color, font, layout, or character count.

In some embodiments, the co-pilot design system utilizes the language abstraction model to tokenize the extracted design elements and associated attributes into a series of language tokens that compose a design language representation. For example, the co-pilot design system tokenizes the extracted design elements and associated attributes into a design language representation comprising a sentence structure—including a sentence beginning token, a sentence ending token, and in between one or more descriptive tokens for an image token, a shape token, and/or a text token. To illustrate, the order or structure of the tokens corresponds to the layer from which the co-pilot design system extracted the corresponding element in the digital design document. Further, the co-pilot design system uses the language abstraction model to perform the tokenization based on a sentence language vocabulary learned from a template corpus (e.g., a Spark document corpus). If applicable, in one or more embodiments, the co-pilot design system also tokenizes elements based on user input (e.g., selection of text, images, or other design elements to include in the modified digital design).

Furthermore, in one or more embodiments, the co-pilot design system generates, from the design language representation, an additional design language representation of a design variation to the digital design document. For example, the co-pilot design system uses a generative language model (e.g., a transformer-based neural network model) to predict attributes for a user-added design element that is not represented by the design language representation. To illustrate, the co-pilot design system uses the generative language model to generate predicted attribute values that correspond to a text token (e.g., <txt> for user-added text) in the design language representation. For instance, the predicted attribute values define the appearance of the user-added text in a manner that comports with the design language representation for the design elements of the digital design document. As examples, these predicted attribute values include text placement, text font, text color, or text size (e.g., <txt>frame:2,4,11,8 font:Economica-Regular layout:left opacity:100 color:999).

Additionally or alternatively, in one or more embodiments, the co-pilot design system uses the generative language model to predict one or more new elements to combine with design elements of the digital design document. For example, regardless of user inputs explicitly providing new design elements, the co-pilot design system uses the generative language model to predict tokens of new elements based on the current design reflected in the design language representation. For instance, these predicted tokens represent new elements that include new shapes, new images, new text, etc.

In certain embodiments, the co-pilot design system generates an additional digital design document with the design variation. For example, the co-pilot design system uses a decoder that parses the additional design language representation from the generative language model. Based on the parsing, the co-pilot design system generates the additional digital design document for display (e.g., within a graphical user interface of a client device).

Moreover, it will be appreciated that in some embodiments the co-pilot design system iteratively generates different design configurations of a digital design document. Indeed, in one or more embodiments, the co-pilot design system keeps certain elements constant while varying (e.g., changing over subsequent iterations) the corresponding attribute values. Still, in other embodiments, the co-pilot design system varies entire elements in design variations such that a given element is not present or required in subsequent iterations.

In one or more embodiments, the co-pilot design system iteratively generates modified digital design documents by identifying which elements and/or attribute values to hold constant or vary (e.g., based on detected dependencies). In other embodiments, the co-pilot design system identifies user inputs indicating which elements and/or attribute values to hold constant or vary. For example, where the co-pilot design system inserts text with a particular color and opacity according to explicit user inputs, the user may need a recommendation regarding a particular font. In such a circumstance, the co-pilot design system keeps the initial design features, while proposing alternatives for the font. This approach leads to an iterative, non-intrusive creative process, where the user can profit from the aid at any given time without giving up control of the design process.

As briefly mentioned above, a number of problems exist with conventional systems. The co-pilot design system addresses many of these technical drawbacks. For example, the co-pilot design system improves system flexibility relative to conventional systems. Indeed, in one or more embodiments, the co-pilot design system implements a wide variety of different text, images, shapes, objects, colors, fonts, sizes, opacity levels, placement positions, etc. Unlike some conventional systems, the co-pilot design system is not subject to strict design rules or limiting, predefined selection options that hinder the artistic creation process but can utilize a generative language model to flexibly generate token values reflecting an array of design modifications across design elements and features. Additionally, the co-pilot design system improves system flexibility by adaptively generating designs and associated variations from different points in the design process. For example, the co-pilot design system flexibly generates a design or design variation by starting from a blank canvas, a polished template, or an incomplete design. Accordingly, the co-pilot design system can flexibly incorporate various inputs and content items and generate a host of different corresponding design variations from various starting points.

In addition to improved system flexibility, the co-pilot design system improves accuracy and efficacy. For example, the co-pilot design system improves the accuracy and effectiveness of computing devices in generating digital design documents by utilizing a generative language model capable of persisting user edits through various design iterations (e.g., holding constant user-identified elements and/or attributes). Moreover, the co-pilot design system improves computer accuracy in generating digital design documents by accounting for dependencies between design elements. For example, unlike conventional systems that fail to account for dependencies, the co-pilot design system intelligently suggests design variations that comport with color themes, text themes, object and facial importance, available copyspace, etc. to generate a digital design document with an aesthetically coherent design.

Furthermore, the co-pilot design system improves efficiency for implementing computing devices. For example, the co-pilot design system significantly reduces the time and number of user interactions needed to generate and modify digital design documents. For example, a client device implementing the co-pilot design system creates a design variation to an initial template (e.g., background or other digital design elements) in response to a single user input. Moreover, the co-pilot design system modifies this digital design document in response to one or more additional client device requests to add content and/or implement additional design variations. This significantly improves the efficiency of user interfaces and user interactions with a design generation application.

As illustrated by the foregoing discussion, the present disclosure utilizes a variety of terms to describe features and benefits of the co-pilot design system. Additional detail is now provided regarding the meaning of these terms. For example, a "digital design document" refers to an editable digital item for portraying digital content (e.g., a digital file that can be edited to include digital text, digital images, digital videos, or other digital design elements). For example, a digital design document can include a .pdf document, ADOBE® SPARK document, or .pptx document. A digital design document can also include a digital image, such as a .jpg image, .tiff image, .heic image).

Similarly, as used herein, the term "digital design element" (or "design element") refers to digital content (or features) corresponding to a digital design document. In particular, a digital design element can include text, a shape, copyspace, a digital image (e.g., an image of an object or face), a digital video, a background image/color/object, a foreground image/color/object, within (or to be added to) a digital design document. Thus, for example a digital design element can include a template background that include a digital image or a colored backdrop.

In addition, as used herein, the term "design variation" refers to a modification to a digital design document (e.g., a modification to a template background or another digital design element). In particular embodiments, a design variation includes an addition, exclusion, or alteration of design elements and/or attributes of design elements. As examples, a design variation includes added text, a different text font, an enlarged logo image, a new shape, a changed position or color, a decreased opacity, etc.

Furthermore, as used herein a "token" refers to a representation of a language unit. In particular, a token includes a digital representation of a word or other unit of a language or vocabulary. Thus, for example, a token can include a string of characters from a language/vocabulary describing a design element or attribute of a digital image. Thus, for instance the co-pilot design system can define a language of design elements or attributes with particular tokens corresponding to individual design elements and attributes. To illustrate, a token can include the character string "img" and a corresponding value reflecting an image design element within a digital design document.

Moreover, as used herein, the term "design language representation" refers to a tokenized description of a digital design document. In particular embodiments, a sentence language description includes a sequence of tokens. For example, a design language representation includes an image token, shape token, text token, bounding box token, background object token, background color token, etc. that represents all or a portion of a digital design document. In one or more embodiments, a design language representation comprises a JavaScript Object Notation (JSON) element.

Furthermore, as used herein, the term "language abstraction model" refers to a model for extracting information from a digital design document (e.g., features of digital design elements of a digital design document). In particular embodiments, a language abstraction model generates a design language representation of a digital design document. Examples of a language abstraction model include one or more machine-learning models, encoders, etc. that are trained to generate a design language representation from a digital design document. The language abstraction model can also include a computer-implemented heuristic model (e.g., that extracts a color distribution from a digital image).

Additionally, as used herein, the term "generative language model" refers to a computer-implemented model for generating a prediction from language. In particular, a generative language model can include a deep learning model trained to predict one or more tokens from one or more input tokens. Thus, a generative language model can include a neural network transformer that generates a predicted design language representation based on an input design language representation. In particular embodiments, a generative language model predicts a next token for a design language representation or predicts a token that completes missing portions of the design language representation. For example, a design language representation may indicate text for combining with existing digital design elements of a digital design document, but leave undefined the text font, color, or size. Accordingly, in this example, the generative language model predicts tokens for one or more of the text font, color, or size.

In one or more embodiments, a language abstraction model and/or a generative language model includes a machine-learning model that can be tuned (e.g., trained) based on inputs to approximate unknown functions. In certain embodiments, a language abstraction model and/or a generative language model includes a particular type of machine-learning model, such as a neural network. A neural network includes interconnected neurons arranged in layers that communicate and learn to approximate complex functions and generate outputs based on a plurality of inputs provided to the model. These layers can include a variety of parameters (e.g., layer weights that emphasize or de-emphasize features) that change during the learning process to improve neural network outputs and predictions. The term machine-learning model includes deep convolutional neural networks ("CNNs"), fully convolutional neural networks ("FCNs"), or recurrent neural networks ("RNNs") such as long short-term memory neural networks ("LSTMs"). In other words, a neural network is an algorithm that implements deep learning techniques or machine learning that utilizes a set of algorithms to attempt to model high-level abstractions in data.

Additional detail will now be provided in relation to illustrative figures portraying example embodiments and implementations of a co-pilot design system. For example, FIG. 1 illustrates a computing system environment (or "environment") 100 for implementing a co-pilot design system 106 in accordance with one or more embodiments. As shown in FIG. 1, the environment 100 includes server(s) 102, a client device 108, and a network 110. Each of the components of the environment 100 communicate (or are at least configured to communicate) via the network 110. Example networks are discussed in additional detail below in relation to FIG. 11.

As further illustrated in FIG. 1, the environment 100 includes the server(s) 102. In some embodiments, the server(s) 102 comprises a content server and/or a data collection server. Additionally, or alternatively, the server(s) 102 comprise an application server, a communication server, a web-hosting server, a social networking server, or a digital content management server.

Moreover, as shown in FIG. 1, the server(s) 102 implement a digital content management system 104. In one or more embodiments, the digital content management system 104 generates, receives, edits, manages, and/or stores digital design documents. For example, in some instances, the digital content management system 104 accesses a digital design document and transmits the digital design document to at least one of the co-pilot design system 106 or the client device 108. In other instances, the digital content management system 104 receives generated digital design documents (e.g., digital design documents with design variations) for transmitting in one or more formats via the network 110, storing in cloud storage hosted on the server(s) 102, etc.

The co-pilot design system 106 can efficiently and accurately generate an additional digital design document with a design variation. To do so, in one or more embodiments, the co-pilot design system 106 leverages a language abstraction model and a generative language model. In particular embodiments, the co-pilot design system 106 uses a language abstraction model to generate a design language representation of a digital design document portraying digital design objects. In addition, the co-pilot design system 106 uses the generative language model to generate an additional design language representation. The co-pilot design system uses the additional design language representation for generating an additional digital design document with a design variation to the initial digital design document (as will be explained below in relation to subsequent figures).

As shown in FIG. 1, the environment 100 includes the client device 108. The client device 108 can include one of a variety of computing devices, including a smartphone, tablet, smart television, desktop computer, laptop computer, virtual reality device, augmented reality device, or other computing device as described in relation to FIG. 11. Although FIG. 1 illustrates a single client device 108, in some embodiments the environment 100 includes multiple client devices 108 (e.g., multiple mobile computing devices connected to each other via the network 110). Further, in some embodiments, the client device 108 receives user input (e.g., to add text, shapes, images, etc.) and provides information pertaining to accessing, viewing, modifying, generating, enhancing, and/or interacting with a digital design document to the server(s) 102.

Moreover, as shown, the client device 108 optionally includes a version of the co-pilot design system 106. In particular embodiments, the co-pilot design system 106 on the client device 108 comprises a web application, a native application installed on the client device 108 (e.g., a mobile application, a desktop application, a plug-in application, etc.), or a cloud-based application where part of the functionality is performed by the server(s) 102. In some embodiments, the co-pilot design system 106 on the client device 108 presents or displays information to a user associated with the client device 108, including additional digital design documents with design variations as provided in this disclosure. Furthermore, in one or more embodiments, the co-pilot design system 106 on the client device 108 captures digital images via a camera and utilizes the digital images within one or more digital design documents. In other implementations, the co-pilot design system 106 on the client device 108 accesses or receives digital design documents from one or more memory devices on the client device 108.

In additional or alternative embodiments, the co-pilot design system 106 on the client device 108 represents and/or provides the same or similar functionality as described herein in connection with the co-pilot design system 106 on the server(s) 102. In some implementations, the co-pilot design system 106 on the server(s) 102 supports the co-pilot design system 106 on the client device 108.

For example, in some embodiments, the server(s) 102 train one or more machine-learning models described herein. The co-pilot design system 106 on the server(s) 102 provides the one or more trained machine-learning models to the co-pilot design system 106 on the client device 108 for implementation. In other words, the client device 108 obtains (e.g., downloads) the co-pilot design system 106 from the server(s) 102. At this point, the client device 108 may utilize the co-pilot design system 106 to generate additional digital design documents with design variations by performing the operations described herein independently from the server(s) 102.

In some embodiments, the co-pilot design system 106 includes a web hosting application that allows the client device 108 to interact with content and services hosted on the server (s) 102. To illustrate, in one or more implementations, the client device 108 accesses a web page or computing application supported by the server (s) 102. The client device 108 provides input to the server(s) 102 (e.g., a digital design document portraying digital design elements). In response, the co-pilot design system 106 on the server(s) 102 performs operations described herein to generate an additional digital design document with design variations. The server(s) 102 then provides the output or results of the operations (e.g., an additional digital design document portraying the design variations) to the client device 108.

In some embodiments, though not illustrated in FIG. 1, the environment 100 has a different arrangement of components and/or has a different number or set of components altogether. For example, in certain embodiments, the client device 108 communicates directly with the server(s) 102, bypassing the network 110. As another example, the environment 100 includes a third-party server comprising a content server and/or a data collection server.

Figure 2:
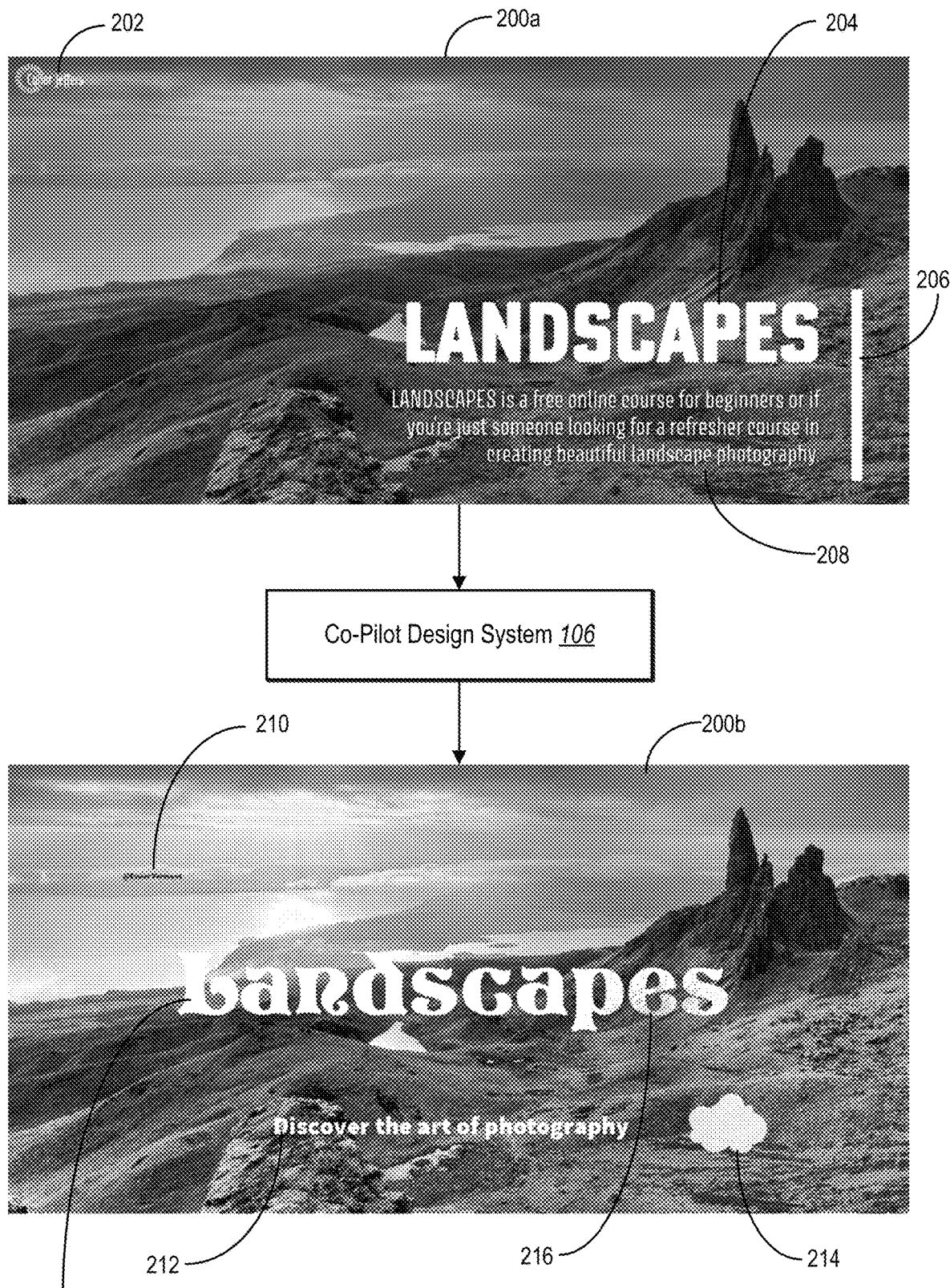
FIG. 2 illustrates a co-pilot design system generating a digital design document with design variations to an input design document in accordance with one or more embodiments.

As mentioned above, the co-pilot design system 106 can flexibly generate digital design documents with design variations. For example, FIG. 2 illustrates the co-pilot design system 106 generating a digital design document with design variations from an input design document in accordance with one or more such embodiments. As shown in FIG. 2, an input design document 200a portrays various design elements 202-208. Specifically, the design element 202 comprises a logo (in this case, a text-shape combination of elements). The design elements 204, 208 comprise text. In addition, the design element 206 comprises a shape (e.g., a vertical bar).

The co-pilot design system 106 uses the design elements 202-208 and other extracted template information from the input design document 200a to generate a digital design document 200b with design variations. Specifically, as will be described below, the co-pilot design system 106 uses a design language representation of the design elements 202-208 (and/or other design elements and extracted template information such as background color, background objects, copyspace) to generate an additional design language representation of one or more design variations. Based on the additional design language representation, the co-pilot design system 106 generates a digital design document 200b comprising design variations to the input design document 200a.

Indeed, as shown in FIG. 2, the co-pilot design system 106 generates the digital design document 200b with new design elements 210-216 that were not present in the input design document 200a. For instance, the design elements 210-212 include text and the design elements 214-216 include shapes (e.g., a cloud and an arrangement of dots, respectively). Further, the co-pilot design system 106 removes the design element 202 and the design elements 206-208. In addition, the co-pilot design system 106 changes both the font and the positioning of the text 204.

In some embodiments, the co-pilot design system 106 automatically generates these design variations from the input digital design document independent of user input or guidance. In other embodiments, the co-pilot design system 106 receives user inputs to guide the creation process. For example, the co-pilot design system 106 receives user inputs to add digital design elements (e.g., images, shape, text, etc.) or change certain attributes. In response, the co-pilot design system 106 suggests attributes (e.g., color, font, positioning, etc.) that finish defining details of the user-added content. Additionally or alternatively, the co-pilot design system 106 suggests additional digital design elements that complement the user-added content. In this manner, the co-pilot design system 106 accommodates user interaction and feedback while intelligently suggesting next design steps.

Although FIG. 2 illustrates generating a digital design document from an input design document, the co-pilot design system 106 can also generate a digital design document without an input design document. For example, in some implementations, the co-pilot design system 106 receives user input indicating a desired digital design document (e.g., user input of text "Adventure with kayaks"). In response, the co-pilot design system 106 can translate the user input into a design language representation (corresponding to a design language) and utilize the design language representation to generate a template digital design document. Similarly, the co-pilot design system 106 can utilize the user input to identify digital images to propose and include within the digital design document. For example, the co-pilot design system 106 can perform a query of a repository of digital images based on the user input, identify a digital image, and then translate the digital image into one or more tokens as part of the design language representation. The co-pilot design system 106 utilizes the image token (from the identified digital image) and a text token (from text entered by the user) to generate a new digital design document.

As briefly discussed above, the co-pilot design system 106 can efficiently and accurately generate digital design documents with design variations as part of an iterative creation process. For example, FIGS. 3A-3B illustrate the co-pilot design system 106 utilizing a language abstraction model and a generative language model to iteratively generate digital design documents with design variations in accordance with one or more such embodiments.

Figure 3A:
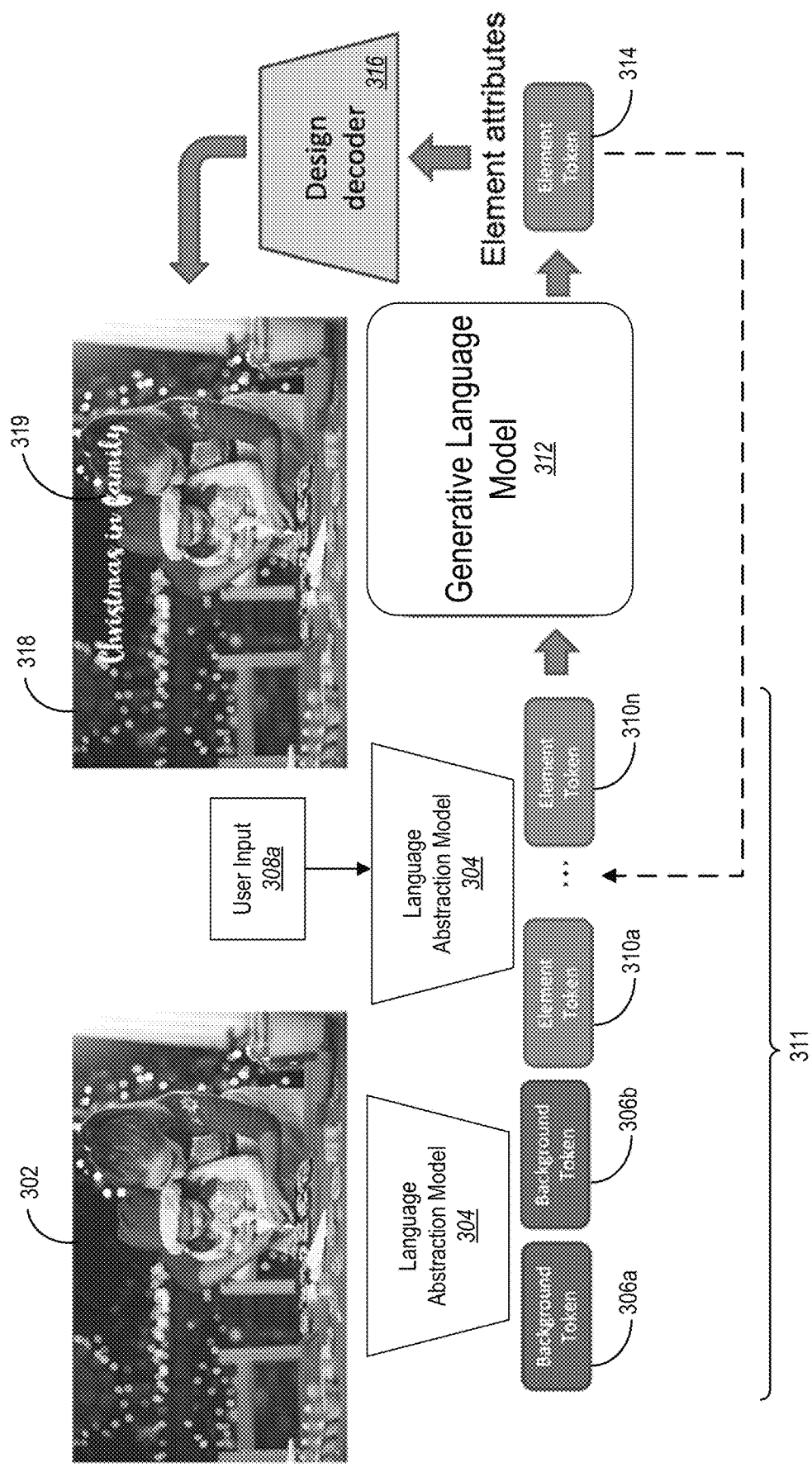
FIGS. 3A-3B illustrate a co-pilot design system utilizing a language abstraction model and a generative language model to generate digital design documents with design variations in accordance with one or more embodiments.
Figure 3B:
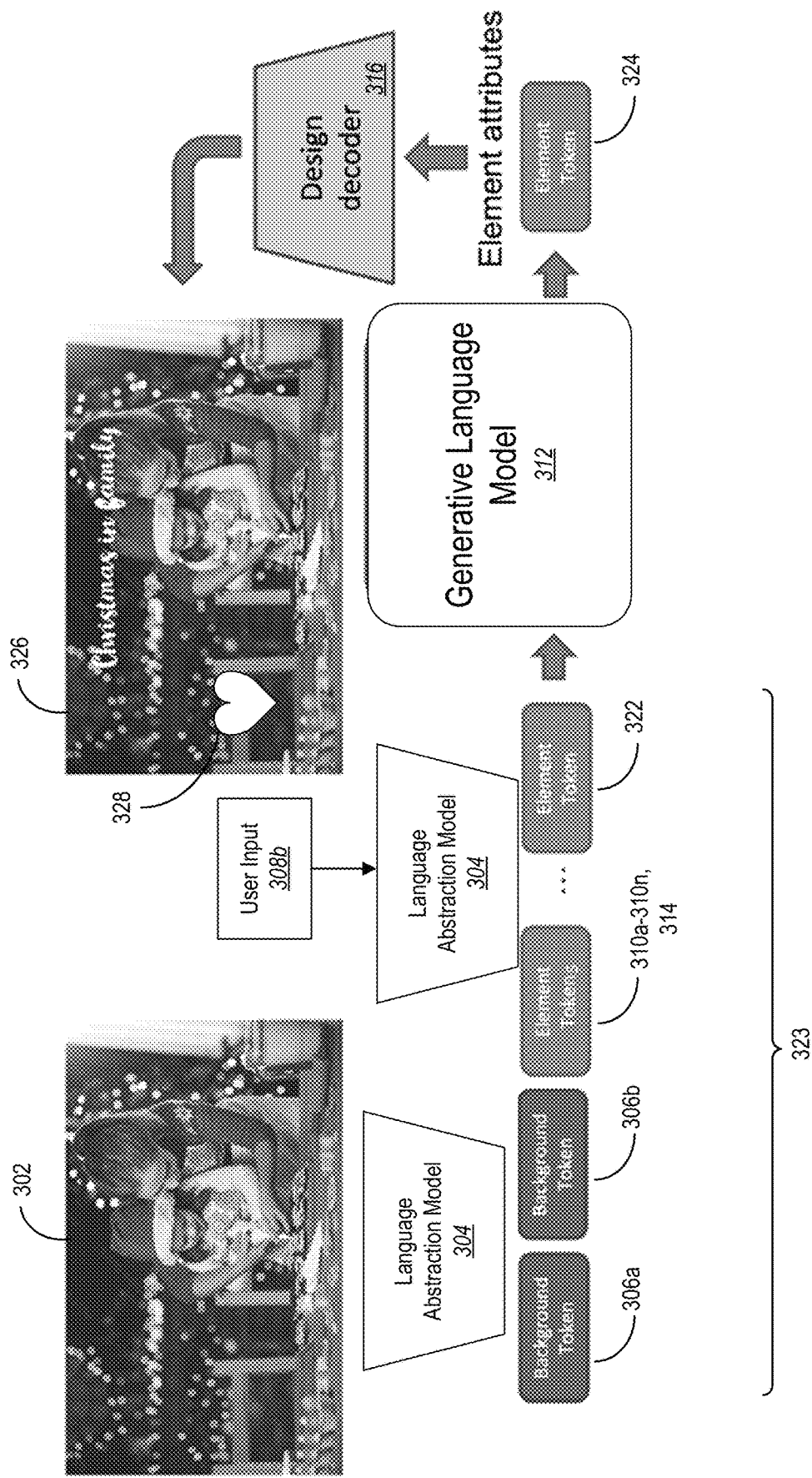

As shown in FIG. 3A, the co-pilot design system 106 identifies a digital design document 302. The co-pilot design system 106 can identify (e.g., receive, request, or access) the digital design document 302 from a variety of sources. For example, the co-pilot design system 106 identifies an upload of the digital design document 302 from a client device or cloud storage. As another example, the co-pilot design system 106 receives the digital design document 302 in response to the client device capturing a digital image via a camera associated with the client device.

Additionally, as shown in FIG. 3A, the co-pilot design system 106 uses a language abstraction model 304 to extract template information (e.g., information regarding the arrangement and contents of the existing digital design elements) from the digital design document 302. The co-pilot design system 106 uses the language abstraction model 304 to tokenize information regarding the digital design document and its corresponding digital design elements. For example, in relation to FIG. 3A, the digital design document 302 only includes a background digital image. Accordingly, the co-pilot design system 106 uses the language abstraction model 304 to generate background tokens 306a-306b. In certain instances, the background tokens 306a-306b comprise one or more of a bounding box token, a background object token, or a background color token. In alternative embodiments, the co-pilot design system 106 generates more or fewer background tokens as part of a design language representation 311.

Although not illustrated in FIG. 3A, the co-pilot design system 106 can generate a variety of additional tokens. For instance, for a digital design document that includes text, shapes, or images, the co-pilot design system 106 can generate additional tokens describing the attributes of these additional digital design elements. Additional detail regarding tokens is provided below (e.g., in relation to FIGS. 4-5).

As shown in FIG. 3A, the co-pilot design system 106 receives one or more user interactions (or indications of user interactions) for modifying the digital design document 302. For example, the co-pilot design system 106 receives a user input 308a to add or change a digital design element of the digital design document 302. In certain implementations, the co-pilot design system 106 receives the user input 308a by identifying a user request to add at least one of an image, shape, or text to the digital design document 302.

In response to the user input 308a, the co-pilot design system 106 uses the language abstraction model 304 to tokenize user input and corresponding modification. Specifically, the co-pilot design system 106 uses the language abstraction model 304 to generate element tokens 310a-310n based on the user input 308a. In one or more embodiments, the element tokens 310a-310n comprise language tokens for images, shapes, text, objects, faces, etc. For example, the language abstraction model 304 generates a text token as one of the element tokens 310a-310n where the user input 308a corresponds to adding the text "Christmas in Family."

As indicated in FIG. 3A, the combination of the background tokens 306a-306b and the element tokens 310a-310n compose a design language representation 311. In one or more embodiments, the design language representation 311 combines the background tokens 306a-306b and the element tokens 310a-310n in a particular sequence. For example, the co-pilot design system 106 combines the background tokens 306a-306b and the element tokens 310a-310n in a sequence ordered by layer. Additional details of generating the background tokens 306a-306b and the element tokens 310a-310n are described below in relation to FIG. 4.

The co-pilot design system 106 uses a generative language model 312 to generate an element token 314 based on the design language representation 311. In one or more embodiments, the generative language model 312 comprises a machine-learning model. For example, in certain implementations, the generative language model 312 comprises a transformer-based model (e.g., a transformer neural network).

A transformer neural network includes a neural network architecture that utilizes positional encodings and attention/self-attention layers to generate predicted outputs. For example, a transformer neural network can include transformer neural network layers that generate encodings of positions or regions of an input (e.g., positions or regions of a design language representation). The plurality of transformer neural network layers compare the encodings to other positions or regions to capture global context information. For example, a transformer neural network layer includes a plurality of encoding layers that include a self-attention layer and a feedforward neural network layer for capturing the global context information.

To illustrate, the generative language model 312 comprises a generative pre-trained transformer model (e.g., a GPT model, GPT-2 model, GPT-3 model, etc.) with one or more attention networks. For example, the co-pilot design system 106 can utilize a transformer based language model as described by H. Sing, G. Verma, and B. Srinivasan in Incorporating Stylistic Lexical Preferences in Generative Language Models, Findings of the Association for Computational Linguistics: EMNLP 2020, 1074-1079 (2020), which is incorporated herein by reference in its entirety. Similarly, in one or more embodiments, the co-pilot design system 106 utilizes a transformer based model described by A. Radford, K. Narsimhan, T. Salimans, and H. Sutskever in Improving Language Understanding by Generative Pre-Training (2018), which is incorporated herein by reference. The co-pilot design system 106 can utilize a variety of different transformer architectures.

In particular embodiments, the co-pilot design system 106 uses the generative language model 312 to predict the element token 314 (e.g., an additional design language representation) based on the contextual hints captured in the design language representation 311. For instance, like predicting a next word in a sentence, certain embodiments of the co-pilot design system 106 use the generative language model 312 to predict a next token in the design language representation 311. As an example, the generative language model 312 predicts a shape token for an arrow or an image of Cupid when the design language representation 311 indicates a heart shape and text "Happy Valentines."

Alternatively, like predicting a missing word in a sentence, certain embodiments of the co-pilot design system 106 use the generative language model 312 to predict the element token 314 that finishes or completes missing portion(s) of the design language representation 311. For example, one or more tokens of the design language representation 311 represent the text "Christmas in Family." However, in continuation of this example, the tokens of the design language representation 311 may not define the attribute values for a text font, text size, text placement, etc. Accordingly, in one or more embodiments, the element token 314 predicts undefined attribute values for attributes of a design element.

Further shown in FIG. 3A, the co-pilot design system 106 utilizes a design decoder 316 to generate an additional digital design document 318 with a design variation 319. For example, the design decoder 316 parses the element token 314. Based on the parsing, the design decoder 316 renders the additional digital design document 318. Specifically, the co-pilot design system 106 uses the design decoder 316 to render the design variation 319 as including a cursive font with white color and a positional placement of top-center in the additional digital design document 318.

As indicated by the dashed arrow in FIG. 3A, in one or more embodiments, the co-pilot design system 106 accounts for the element token 314 in a next design iteration. This next design iteration is described in further detail below in relation to FIG. 3B.

Specifically, in FIG. 3B, the co-pilot design system 106 generates a design language representation 323 comprising the element tokens corresponding to one or more prior operations (e.g., the element tokens 310a-310n for the user input 308a). In addition, the co-pilot design system 106 generates the design language representation 323 comprising the element token 314 from the generative language model 312 predicted for the prior design iteration. Still further, the co-pilot design system 106 generates the design language representation 323 by utilizing the language abstraction model 304 to generate an element token 322 based on another user input 308b (e.g., to add a heart shape).

In a same manner as described above, the co-pilot design system 106 uses the generative language model 312 to predict an element token 324 (e.g., another additional design language representation) based on the design language representation 323. Further, the co-pilot design system 106 utilizes the design decoder 316 to parse the element token 324 and render another additional design document 326 with a design variation 328. In this case, the design variation 328 comprises a heart corresponding to predicted attribute values from the element token 324 of white color, solid filled, and left-side frame positioning.

Further, in one or more embodiments, the co-pilot design system 106 again provides the output from the generative language model 312 for a next design iteration. For example, although not shown in FIG. 3B, the co-pilot design system 106 adds the element token 324 to a further design language representation for input to the generative language model 312 in a third design iteration. In this manner, certain embodiments of the co-pilot design system 106 repeat the acts described above for accurate, user-controlled and system aided design.

Although FIG. 3A illustrates the co-pilot design system 106 starting with a digital design document 302 (i.e., a digital image) and the user input 308a, the co-pilot design system 106 can also generate a digital design document with only the digital design document 302 or with only the user input 308a. Indeed, as mentioned with regard to FIG. 2, the co-pilot design system 106 can generate a template digital design document from user input indicating a text phrase, an image, or a shape.

As discussed above, the co-pilot design system 106 can distill document designs into informative language-based tokens. These tokens are highly extensible, versatile, and adaptable for a wide variety of digital design documents and corresponding designs. In accordance with one or more embodiments, FIG. 4 illustrates the co-pilot design system 106 translating a digital design document to a design language representation utilizing a language abstraction model.

Figure 4:
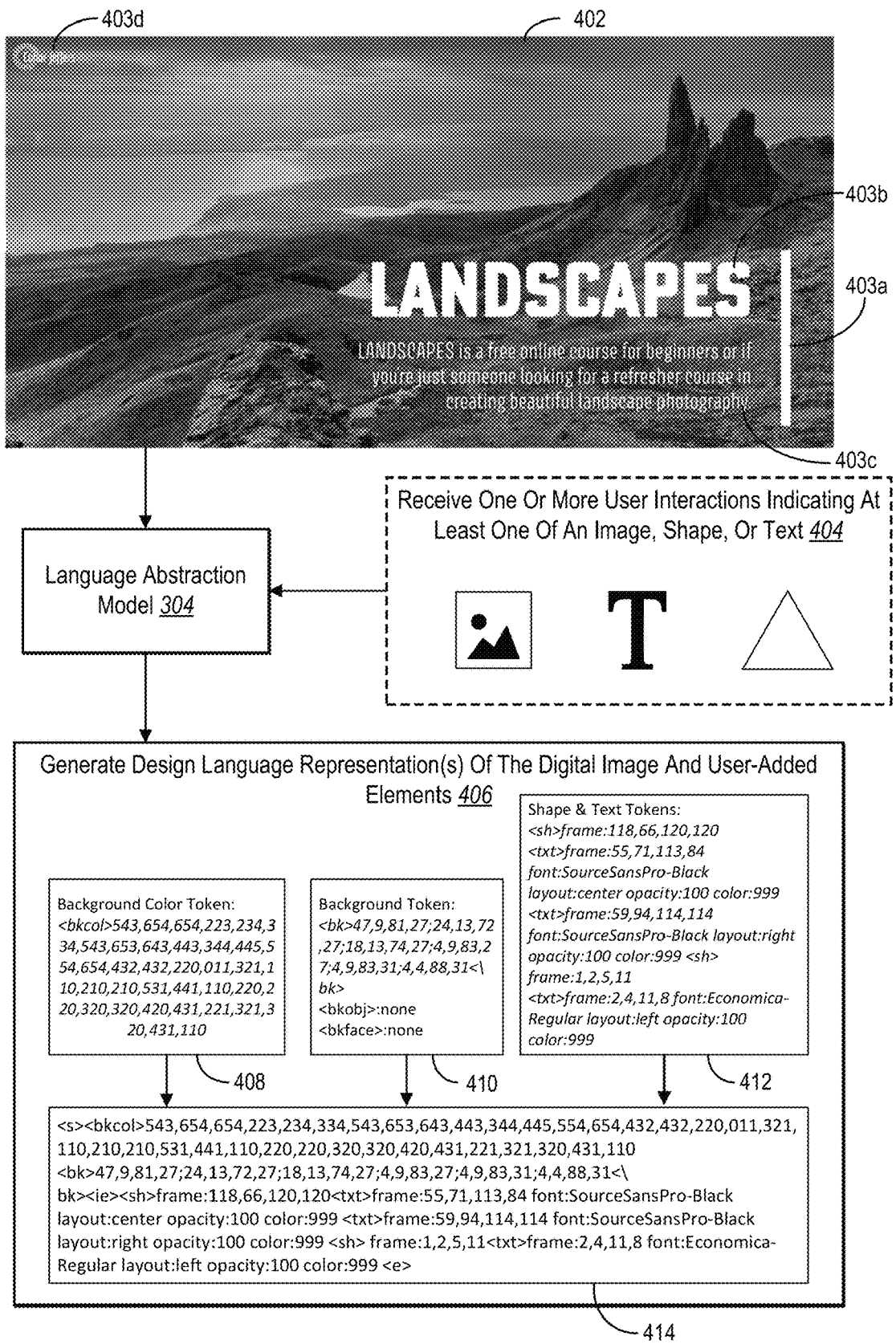
FIG. 4 illustrates a co-pilot design system translating a digital design document portraying digital design elements to a design language representation utilizing a language abstraction model in accordance with one or more embodiments.

As shown in FIG. 4, the co-pilot design system 106 utilizes the language abstraction model 304 to extract template information from a digital design document 402. In one or more embodiments, template information includes a variety of information about the digital design document 402. For example, the template information includes aspect ratio, size, and background information. The co-pilot design system 106 can also extract information regarding various digital design elements within the digital design document 402.

To extract this template information, the co-pilot design system 106 implements one or more different models for the language abstraction model 304. For example, in some embodiments, the co-pilot design system 106 extracts background information (e.g., to reduce or eliminate undesirable placement of design elements). This is particularly useful when the template background portrayed in the digital design document 402 comprises image content as opposed to a solid-colored background. Accordingly, the co-pilot design system 106 contextualizes an otherwise naïve probability distribution for random placement of a design element within a template background.

In certain embodiments, the co-pilot design system 106 extracts background information utilizing a neural network. To illustrate, the co-pilot design system 106 causes the language abstraction model 304 (as a trained neural network) to analyze the digital design document 402. In response, the language abstraction model 304 generates a predicted copyspace or freespace (e.g., a blank space or a space without or with fewer elements/objects of interest). The predicted copyspace is potentially suitable for placement of digital design elements. In one or more embodiments, the language abstraction model 304 generates the predicted copyspace in the form of a heatmap (e.g., a probability map indicating a likelihood of a pixel corresponding to an object or object of interest).

As another example, in one or more embodiments, the co-pilot design system 106 uses the language abstraction model 304 to extract bounding boxes for text placement. For example, in one or more embodiments, the language abstraction model 304 comprises a machine-learning model that predicts bounding boxes based on a copyspace heatmap.

Additional examples of extracted contextual information include object information. For instance, in one or more embodiments, the co-pilot design system 106 uses the language abstraction model 304 to extract information for myriad different objects. In certain implementations, the language abstraction model 304 extracts information for two categories of objects, namely generic objects (animate or inanimate) and faces. In particular embodiments, the co-pilot design system 106 trains the 304 to extract object information according to these two categories because faces typically remain uncovered (e.g., for aesthetic appeal). In contrast, other objects (like a plate of food or a cart) are typically covered by or layered with other design elements. In some embodiments, the co-pilot design system 106 uses a different number/type of classifications (e.g., animals, vehicles, landscape objects, etc.).

In one or more embodiments, the co-pilot design system 106 uses object information to prioritize or deemphasize (e.g., ignore) certain background information conveying bounding boxes. For example, the co-pilot design system 106 can ignore a bounding box for a generic object when it overlaps a bounding box for a face. Alternatively, the co-pilot design system 106 prioritizes the bounding box for the face over the bounding box for the generic object. As another example, the co-pilot design system 106 deemphasizes (e.g., ignores) bounding boxes for objects that satisfy a threshold size (e.g., 80% of the digital design document 402).

In a further example, the co-pilot design system 106 uses the language abstraction model 304 to extract background color such that design variations are visible and visually coherent. For example, the language abstraction model 304 identifies a single background color portrayed in the template background of the digital design document 402 (e.g., according to metadata or other indication of a single pixel color value). As another example, the co-pilot design system 106 identifies multiple background colors, such as the dominant colors. To do so, the co-pilot design system 106 implements one or more of different approaches. For example, the co-pilot design system 106 causes the language abstraction model 304 to implement a k-means approach. Using the k-means approach, the co-pilot design system 106 causes the language abstraction model 304 to split the background image into an n×n grid of image sections (e.g., section blocks of 6×6) and determine a dominant color for each image section. As another example, the language abstraction model 304 determines an average or interpolated pixel color value for each image section.

As mentioned, the co-pilot design system 106 also uses the language abstraction model 304 to extract digital design elements associated with digital design document 402. For example, the co-pilot design system 106 utilizes the language abstraction model 304 to extract information associated with a text element by identifying metadata associated with the text (e.g., to identify a font, font color, font size, text placement, text box size, etc.). Additionally or alternatively, the language abstraction model 304 uses optical character recognition and/or a trained machine-learning model to identify a character count, wording, or semantic similarity.

In a same or similar fashion, the co-pilot design system 106 extracts shape information or image information from the digital design document. For instance, the co-pilot design system 106 causes the language abstraction model 304 to determine an opacity, color, filter, frame, etc. of a shape element or an image element. In one or more embodiments, the language abstraction model 304 extracts such information from metadata associated with a shape element or an image element. Additionally or alternatively, the language abstraction model 304 utilizes a machine-learning model to identify one or more of bounding boxes (e.g., frame coordinates), pixel color values, opacity levels, alignment or placement configurations, etc.

Moreover, as shown at an act 404 of FIG. 4, the co-pilot design system 106 receives one or more user interactions indicating at least one of an image, shape, or text. For example, the co-pilot design system 106 receives textual inputs via a graphical user interface of a client device. For instance, the co-pilot design system 106 receives textual inputs in an entry field configured to receive alpha-numeric characters. As another example, the co-pilot design system 106 receives user selection of an image or shape via the graphical user interface. In certain instances, the co-pilot design system 106 instantiates a camera viewfinder of a client device to capture a live image (e.g., a selfie) for adding to the template background portrayed in the digital design document 402.

In one or more embodiments, the co-pilot design system 106 extracts information from user-added content in a same or similar manner as discussed above. For example, the language abstraction model 304 extracts text, image, or shape information by leveraging corresponding metadata and/or a machine-learning model trained to extract such information.

At an act 406, the co-pilot design system 106 uses the language abstraction model 304 to generate a design language representation 414 of the digital design document 402, in addition to user-added elements (as applicable). To do so, in one or more embodiments, the co-pilot design system 106 causes the language abstraction model 304 to translate the extracted information (discussed above) into a sequence of tokens.

In some embodiments, the sequence of tokens includes one or more different formats. In particular embodiments, the language abstraction model 304 tokenizes the extracted information element-by-element to form a sequence of tokens. For example, the language abstraction model 304 begins a sequence with a starting marker (e.g., <s>). In addition, the language abstraction model 304 begins each element definition in the sequence of tokens with a special token that signals the type of element (e.g., an image, shape, or text) being defined. The language abstraction model 304 follows the special token for the element with an attribute and a corresponding attribute value (e.g., in the "attribute_name:attribute_value" format, separated by whitespaces). In one or more embodiments, this tokenization language provides an informative, yet highly adaptable description of the template background and user-added content. For instance, the co-pilot design system 106 may define one attribute, but not others.

After defining one or more elements, the language abstraction model 304 ends the series of tokens with an ending marker (e.g., <e>). In certain implementations, the language abstraction model 304 further separates the template information extracted from the digital design document 402 and the user-added content. For example, the language abstraction model 304 marks the end of the template information and the start of user-added elements with the token <ie>. Thus, in particular embodiments, the language abstraction model 304 generates the design language representation 414 according to the following format: <s>template_info<ie><el_type1>attributes . . . <el_typeN>attributes<e>

According to one or more embodiments, the language abstraction model 304 uses the following tokenization template outlined in Table 1.

TABLE 1

| Element type/ special token | Attribute | Attribute values |
|---|---|---|
| Image, <img> | frame: | x1, y1, x2, y2 - the bounding box |
| | opacity: | value in [0,100] |
| | filter: | Grayscale, Darken, Contrast, Matte, Lighten, Colorize, Multiply |
| | blur: | value in [0,100] |
| Shape, <sh> | frame: | x1, y1, x2, y2 - the bounding box |
| | color: | rgb |
| | opacity: | value in [0,100] |
| Text, <txt> | charcount: | Value in [0,10], index of bin from [(1,5),(5,10),(10,15),(15,20),(20,30), (30,50),(50,80),(80,150),(150,500), (500,10000)] |
| | frame: | x1, y1, x2, y2 - the bounding box |
| | font: | the name of the font |
| | layout: | the alignment of the text: left, right, center, justified |
| | opacity: | value in [0,100] |
| | color: | rgb |

As shown in Table 1, the language abstraction model 304 generates an image token using the special token <img> followed by one or more attributes of frame, opacity, filter, or blur with corresponding attribute values. The co-pilot design system 106 defines a domain for each of the image attributes as follows. The attribute values for the frame attribute include the bounding box defined by positional coordinates x1, y1, x2, y2. In certain implementations, the co-pilot design system 106 limits the spatial coordinates to decrease a frame domain size that could otherwise be excessively large (and therefore lend to unnecessarily large vocabularies). For example, the co-pilot design system 106 limits the frame domain by quantizing the spatial coordinates according to function (1) below:

$$\frac{x}{\text{range size}} * \text{new range size} \qquad (1)$$

where x is the value to be translated, range size is the length of the old domain ([0, width) and [0, height) for coordinates, and new range size is the length of the new quantized domain. It will be appreciated that quantizing elements with respect to width and height separately lends to a tokenization language that is aspect ratio agnostic. In certain implementations, this advantageously imparts a regularization effect in addition to providing a more packed data distribution to facilitate correlations.

In one or more embodiments, the co-pilot design system 106 performs an additional clipping step for frame attribute values. For example, ADOBE® SPARK template elements can reside partially outside a digital design document or canvas. Therefore, in certain implementations, the co-pilot design system 106 limits the frame domain to include spatial coordinates in the range of [0,127]. Alternatively, the co-pilot design system 106 allows elements to overflow and/or allows a threshold overflow tolerance of the range (e.g., a frame range of [0,127]+/−3).

The co-pilot design system 106 also defines domains for other design element attributes. For example, the attribute values for the opacity attribute include a value in the range of [0,100]. Additionally, the attribute values for the filter attribute include grayscale, darken, contrast, matte, lighten, colorize, and multiply. Further, the attribute values for the blur attribute include a value in the range of [0,100].

Additionally shown in Table 1, the language abstraction model 304 generates a shape token using the special token <sh> followed by one or more attributes of frame, color, or opacity. In one or more embodiments, a shape refers to a manipulable object that includes lines, circles, arcs, and/or polygons. For example, a shape can include a drawing object defined by a boundary or frame and having a polygonal visualization that can be filled with color, expanded, contracted, re-oriented, or transformed. The co-pilot design system 106 likewise defines a domain for each of the shape attributes. For example, the co-pilot design system 106 defines the domains for frame and opacity attribute values as discussed above.

In addition, the co-pilot design system 106 defines a domain (e.g., an RGB domain) for the color attribute. In particular embodiments, the co-pilot design system 106 similarly implements quantization of the color domain for the advantages discussed above in relation to quantizing the frame domain. For example, using function (1), the co-pilot design system 106 quantizes the color domain such that x is the value to be translated, range size is the length of the old color domain (i.e., [0, 255]), and new range size is the length of the new quantized color domain. In particular embodiments, the co-pilot design system 106 defines the color domain to include the range [2,9], with 8 values per channel because 512 colors are sufficiently rich for most users. Additionally, in one or more embodiments, the co-pilot design system 106 provides an offset of 2 to the color channels to avoid confusion or overlap with the coordinate frame representation. For example, the color representation [222-999] does not overlap with the coordinate frame representation [0-127].

Further shown in Table 1, the language abstraction model 304 generates a text token using the special token <txt> followed by one or more attributes of character count, frame, font, layout, opacity, or color. The co-pilot design system 106 likewise defines a domain for each of the text attributes. For example, the co-pilot design system 106 defines the domains for frame, opacity, and color attribute values as discussed above. In addition, the co-pilot design system 106 defines a domain for font attribute values as including the name of the font. Further, the co-pilot design system 106 defines a domain for layout attribute values as including one of left, right, center, or justified alignment.

Additionally, the co-pilot design system 106 defines a domain for the character count domain. In one or more embodiments, the co-pilot design system 106 defines a domain for character count attribute values based on inferred relationships between text length and a purpose or intent of the text. For example, text with a few characters is likely big because the text most likely composes a title, header, or point of interest. Therefore, text with a few characters also likely has a specific shape (usually wider than taller). By contrast, medium-length texts reflect common information. Therefore, medium-length text is likely smaller than the title. Additionally, the shape of medium-length text is more like a square. Furthermore, long texts typically correspond to a large box so that the text can fit.

The co-pilot design system 106 can utilize one or more different approaches for defining the domain for character count attribute values. In some embodiments, the co-pilot design system 106 implements an approach that utilizes a partial range of text sizes (e.g., because a text of length 4 differs little from a text of length 5 with respect to intent). In particular embodiments, the co-pilot design system 106 uses an unequal width binning strategy. Under the unequal width binning strategy, the different bins and associated length intervals correspond to distributions of text lengths historically utilized in templates. In accordance with one or more such embodiments, the co-pilot design system 106 determines a domain for character count attribute values as including a value in the range [0,10] that corresponds to an index for one of the following bins [(1,5), (5,10), (10,15), (15,20), (20,30), (30,50), (50,80), (80,150), (150,500), (500, 10000)].

Based on the tokenization template as outlined above in relation to Table 1, the co-pilot design system 106 causes the language abstraction model 304 to generate the design language representation 414. The design language representation 414 comprises tokens for each digital design element extracted from the digital design document 402 and each user-added element. For example, the language abstraction model 304 generates shape and text tokens 412. In particular, the shape and text tokens 412 in this case include a first shape token corresponding to a white vertical bar 403a on the right-hand side of the template background portrayed in the digital design document 402. Additionally, the shape and text tokens 412 in this instance include first and second text tokens respectively corresponding to a title 403b and description 403c adjacent to the white vertical bar 403a. Further, the shape and text tokens 412 in this case include a second shape token and third text token that correspond to a logo 403d of the template background in the top left corner of the digital design document 402.

Although not illustrated in FIG. 4, it will be appreciated that certain embodiments of the language abstraction model 304 also generate other element tokens for the design language representation 414. For example, the language abstraction model 304 generates tokens for design elements extracted from digital design document or added to the digital design document.

As shown in FIG. 4, the language abstraction model 304 also generates a background token 410 representing the extracted background information of the digital design document 402. To illustrate, the language abstraction model 304 generates the background token 410 representing extracted background placement information (e.g., copyspace) via bounding box coordinates. Specifically, the language abstraction model 304 generates the background token 410 by encapsulating the bounding boxes for copyspace (e.g., freespace or space without foreground objects or items of interest) between two special tokens, <bk> and <\bk> that mark the beginning of the background placement information and the end, respectively.

Additionally, in certain implementations, the language abstraction model 304 generates the background token 410 in a different format. For example, the language abstraction model 304 generates the background token 410 with a semicolon instead of a whitespace. These or other formatting differences can signal different interpretations or vocabulary terms for the generative language model (discussed below in relation to FIG. 5).

In one or more embodiments, the language abstraction model 304 further generates background object tokens and/or face tokens as part of the background token 410 (or else separately from the background token 410). Although not applicable for the digital design document 402 in this instance, certain embodiments of the language abstraction model 304 generate a background object token representing extracted background object information (e.g., an object bounding box). In certain implementations, the language abstraction model 304 generates the background object token in the form of <bkobj>xa1, ya1, xa2, ya2; xb1, yb1, xb2, yb2; <\bkobj>. In this format, <bkobj> and <\bkobj> are special tokens signaling the beginning and end of a background object token. These special tokens encapsulate the bounding box information extracted for objects portrayed in the background (e.g., a dog, a dish, or a car portrayed in a background image).

Additionally, in one or more embodiments the co-pilot design system 106 causes the language abstraction model 304 to generate a face token. For example, the language abstraction model 304 generates a face token representing extracted facial information (e.g., a face bounding box around a face or head of a person). In certain implementations, the language abstraction model 304 generates the background object token as follows: <bkfaces>xa1, ya1, xa2, ya2; xb1, yb1, xb2, yb2; <\ bkfaces>. In this format, <bkfaces> and <\bkfaces> are special tokens that signal the start and finish of a face token. Moreover, the language abstraction model 304 delineates, between the special tokens, the bounding box coordinates for faces.

Furthermore, at the act 406, the co-pilot design system 106 causes the language abstraction model 304 to generate a background color token 408. The background color token 408 represents color information extracted from the template background portrayed in the digital design document 402. In particular embodiments, the background color token 408 represents the dominant colors in the template background (e.g., a background digital image). For example, the background color token 408 represents the dominant colors for a 6×6 grid of image sections. In this example, the background color token 408 comprises thirty-six pixel color values corresponding to the thirty-six image sections (e.g., as reflected in FIG. 4). Moreover, as indicated in FIG. 4, the language abstraction model 304 sets off the background color token 410 with the special token <bkcol>.

In addition, the co-pilot design system 106 can utilize a variety of different color features within the background color token 408. For example, the co-pilot design system 106 can include a color histogram, a predominant color, an average color, or a color distribution within the background color token 408.

The co-pilot design system 106 uses the language abstraction model 304 to generate the design language representation 414 based on each of the background color token 408, the background token 410, and the shape and text tokens 412. For example, the language abstraction model 304 combines the background color token 408, the background token 410, and the shape and text tokens 412. In particular embodiments, the language abstraction model 304 generates the design language representation 414 by combining the background color token 408, the background token 410, and the shape and text tokens 412 in a particular order. For example, the language abstraction model 304 generates the design language representation 414 by arranging tokens in an order that corresponds to a layer (e.g., a z-order or element depth) of the digital design document 402. To illustrate, the language abstraction model 304 arranges the tokens of the design language representation 414 in a sequential order such that a first token corresponds to a first layer (e.g., a background layer) of the digital design document 402, a second token corresponds to a second layer (e.g., the first shape of the digital design document—the white vertical bar 403a), and so forth to the last token for the last layer.

In other embodiments, the language abstraction model 304 generates the design language representation 414 to include tokens arranged by order other than design document layer. For instance, the language abstraction model 304 orders the tokens of the design language representation 414 according to an order of operation or feature importance. To illustrate a specific example, the language abstraction model 304 orders the character count attribute value (e.g., a bin index) ahead of the frame attribute value. In contrast, certain embodiments of the language abstraction model 304 orders color or opacity values of a text element after the font value because the color and opacity values do not influence (e.g., create a dependency for) the font value. Other implementations of the language abstraction model 304 utilize myriad other orderings, but in a consistent manner.

In alternative embodiments, the co-pilot design system 106 uses the language abstraction model 304 to generate one or more tokens that differ from those described above. For example, in certain implementations, the language abstraction model 304 generates tokens for a digital video or other digital content. Similarly, the language abstraction model 304 generates tokens with different attributes or attribute values (e.g., generating tokens that implement a vertical flip augmentation or a horizontal flip augmentation). Alternatively, the language abstraction model 304 generates tokens with different attributes or attribute values for global transformations to digital design documents (e.g., global vertical or horizontal flips) where all elements undergo the same transformation. Further, in some embodiments, the language abstraction model 304 generates tokens only for certain attribute values (e.g., required attribute values, such as position for certain embodiments).

Figure 5:
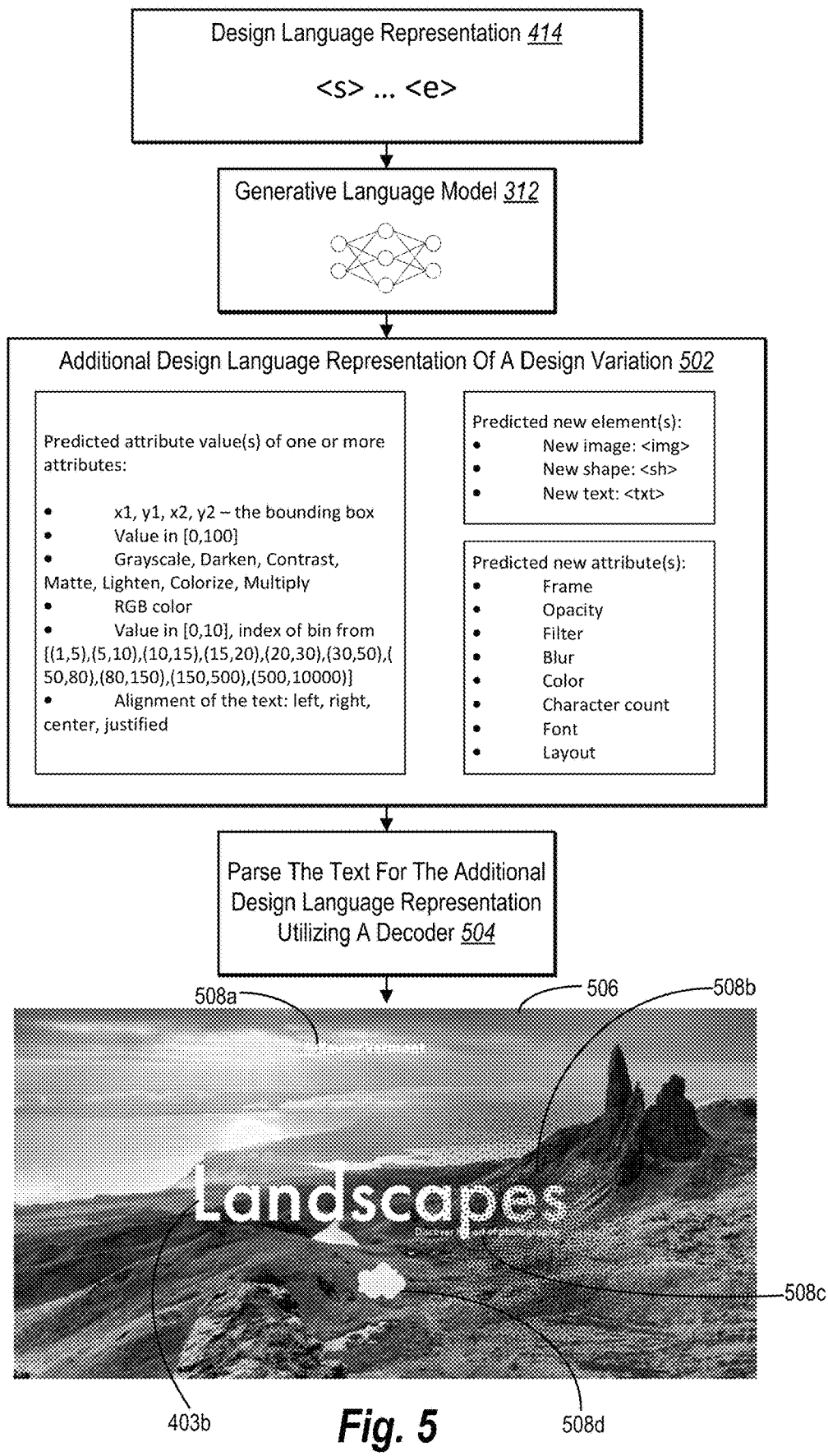
FIG. 5 illustrates a co-pilot design system using a generative language model to generate an additional design language representation of a design variation in accordance with one or more embodiments.

As discussed above, certain embodiments of the co-pilot design system 106 leverage creative power of a generative language model to intelligently predict one or more element tokens. FIG. 5 illustrates the co-pilot design system 106 using the generative language model 312 to generate an additional design language representation of a design variation in accordance with one or more embodiments.

As shown at an act 502 in FIG. 5, the co-pilot design system 106 uses the generative language model 312 to generate an additional design language representation of a design variation based on the design language representation 414 discussed above. Indeed, certain embodiments of the co-pilot design system 106 generate the additional design language representation to include at least one of a predicted attribute value, a predicted new attribute (and corresponding attribute value), or a predicted new element (and corresponding attributes and attribute values). With such flexibility, the co-pilot design system 106 provides capability to implement a wide range of use-cases.

For example, the co-pilot design system 106 uses the generative language model 312 to perform attribute suggestion (i.e., attribute prediction). In such embodiments, the generative language model 312 generates the additional design language representation by predicting attribute values for attributes (e.g., required attributes) that are unpopulated (e.g., unfinished or incomplete) in the design language representation 414. The co-pilot design system 106 can generate a prediction to populate these attributes and attribute values.

For instance, although not shown in the design language representation 414, in certain implementations, the design language representation 414 includes a special token indicative attribute names without corresponding attribute values. As an example, a design language representation can include a text token of "<txt> frame: font: layout: opacity: color:" where none of the text attributes of frame, font, layout, opacity, or color include attribute values following the respective colons.

In one or more embodiments, the generative language model 312 generates an inference based on the design language representation 414 including an incomplete (unpopulated) element description without attribute values. Specifically, the generative language model 312 generates the additional sentence language description by predicting one or more tokens that complete the element description signaled by the special token and attribute names.

In certain embodiments, the co-pilot design system 106 predicts an attribute in one or more different ways. For example, in some embodiments, the co-pilot design system 106 holds fixed those portions of the design language representation 414 that do not need to be predicted (e.g., the special token for the element and the attribute name). Additionally, in certain embodiments, the generative language model 312 generates a probability distribution for an attribute value. The generative language model 312 generates the probability distribution for the attribute value based on the conditioning of the incomplete token phrase in the design language representation 414. In one or more embodiments, the co-pilot design system 106 generates a predicted attribute value by sampling an attribute value from the probability distribution.

In one or more embodiments, the co-pilot design system 106 increases a variability of suggested design variations (e.g., predicted attributed values). For example, in certain implementations, the co-pilot design system 106 implements a softmax temperature weighting for the generative language model 312. To illustrate, in some embodiments, the softmax temperature weighting favors design variations with varied coordinate positioning and varied fonts for text elements. Specifically, in certain embodiments, the generative language model 312 utilizes a softmax temperature weighting of 3.0 for coordinates, 2.0 for fonts and colors, and 1.0 for other elements.

In one or more embodiments, the co-pilot design system 106 presents as design alternatives a list of possibilities, ordered according to the probability distribution generated by the generative language model 312. For example, in one or more embodiments, the co-pilot design system 106 will present as alternatives the top 5 color choices for a text element token, ordered according to the probability distribution.

Although FIGS. 4 and 5 illustrate a specific example implementation of generating a digital design document, the co-pilot design system 106 can generate a digital design document in a variety of different workflows or implementations. For example, in some embodiments, the co-pilot design system 106 utilizes the generative language model 312 to predict layout alternatives. Under this approach, the co-pilot design system 106 takes an input template and creates alternative layouts based on the original content in the input template (e.g., without user inputs indicating user-added content). To do so, the co-pilot design system 106 causes the generative language model 312 to generate an additional design language representation that preserves elements and some (or none) of the attributes in the design language representation. Additionally or alternatively, the co-pilot design system 106 causes the generative language model 312 to generate an additional design language representation that predicts missing attributes (as discussed above).

In another alternative embodiment, the co-pilot design system 106 utilizes the generative language model 312 for template auto-generation. In this embodiment, the co-pilot design system 106 utilizes user input for a search query to search for relevant background images and place the text associated with the user input. For example, the co-pilot design system 106 searches for relevant background images with mountain scenery based on a search query (e.g., a title query) for "mountains." In particular embodiments, a language-based search provides increased variation of design suggestions.

Additionally or alternatively, in certain template auto-generation embodiments, the co-pilot design system 106 captures a user selection of elements and either a background color or a background image in a design language representation. In response, the co-pilot design system 106 uses the generative language model 312 to predict attributes and/or attribute values for automatically generating template suggestions. In certain cases, the generative language model 312 predicts one or more next template elements.

In sum, the co-pilot design system 106 can intelligently generate digital design documents from a variety of different user interactions, digital design elements, and/or template digital design documents. Moreover, the co-pilot design system 106 can intelligently select the digital design elements, attributes, and attribute values to modify or hold fixed. The co-pilot design system 106 can modify tokens and the design language representation to indicate the digital design elements, attributes, and/or attribute values to modify and utilize a generative language model to predict a new design language representation and generate a digital design document reflecting a design variation. Further, in some embodiments, the co-pilot design system 106 generates a predicted token by sampling (e.g., randomly sampling) from a probability distribution. In certain implementations, the co-pilot design system 106 achieves more meaningful variation by not requiring selection of the most probable suggestion according to the probability distribution.

Indeed, as illustrate in FIG. 5 at an act 504, the co-pilot design system 106 generates an additional digital design document 506 based on the additional design language representation from the generative language model 312. In one or more embodiments, the additional digital design document 506 comprises one or more design variations to the digital design document 402 of FIG. 4.

In particular, at the act 504, the co-pilot design system 106 parses the text of the additional design language representation utilizing a decoder. To illustrate, the decoder parses the additional design language representation as JSON data to render the additional digital design document 506.

As depicted, the additional digital design document 506 comprises new elements 508a-508d not found in the digital design document 402 of FIG. 4. Further, the additional digital design document 506 comprises a design variation to the title 403b also in the digital design document 402 of FIG. 4. Specifically, the co-pilot design system 106 centered the title 403b and changed its corresponding font and font size. Moreover, the additional digital design document 506 omits other elements present in the digital design document 402 of FIG. 4.

As discussed above, certain embodiments of the co-pilot design system 106 iteratively generate design variations. For example, FIG. 6 illustrates the co-pilot design system 106 generating another digital design document based on another design language representation in accordance with one or more embodiments.

Figure 6:
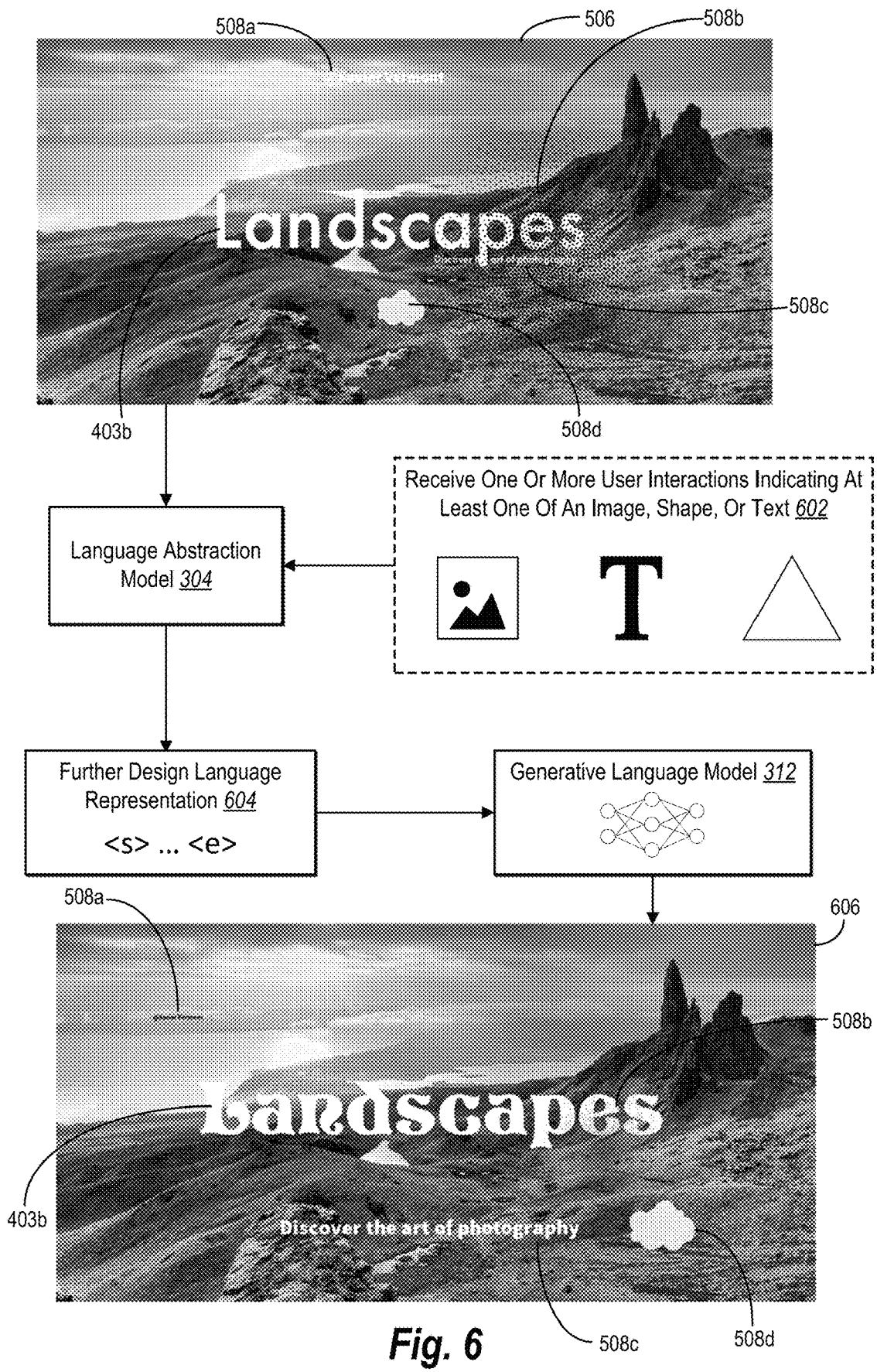
FIG. 6 illustrates a co-pilot design system generating another digital design document based on another design language representation in accordance with one or more embodiments.

As shown in FIG. 6, the language abstraction model 304 generates a further design language representation 604 based on the additional digital design document 506 that the co-pilot design system 106 suggested for a previous (e.g., first) iteration. To do so, the language abstraction model 304 extracts template information from the digital design document and corresponding digital design elements. For example, the language abstraction model 304 extracts background element information by generating one or more of a background token, a background object token, or a background color token as described above in relation to FIG. 4. In addition, the language abstraction model 304 extracts additional element information from the additional digital design document 506 by tokenizing the title 403b and elements 508a-508d utilizing a template abstraction language according to Table 1 discussed above.

Alternatively, in one or more embodiments, the language abstraction model 304 need not re-tokenize background information or elements of the additional digital design document 506 to generate the further design language representation 604. Rather, in certain implementations, the co-pilot design system 106 re-uses tokens previously generated (e.g. for computational efficiency). For example, the co-pilot design system 106 combines the tokens of the design language representation from the prior iteration (e.g., the design language representation 414 of FIG. 4) and the predicted token of the additional design language representation predicted at the prior iteration (e.g., at the act 502 of FIG. 5).

At an optional act 602, the co-pilot design system 106 receives one or more user interactions indicating at least one of an image, shape, or text. As discussed above in relation to FIG. 4, the co-pilot design system 106 receives user interactions indicating a digital image or shape. For example, the co-pilot design system 106 can receive a digital image captured via a camera associated with an implementing client device. Similarly, the co-pilot design system 106 can receive text via one or more textual inputs provided in a user interface field configured to receive alphanumeric characters. Moreover, the co-pilot design system 106 can receive text via a voice input from a microphone associated with an implementing client device. The co-pilot design system 106 can also receive user interactions indicating design elements, attributes, and/or attribute values to hold fixed or modify.

Based on user-added elements at the act 602, the language abstraction model 304 similarly extracts element information from the user-added elements to generate the further design language representation 604. Indeed, the co-pilot design system 106 generates the further design language representation 604 by causing the language abstraction model 304 to tokenize the user-added elements utilizing the template abstraction language from Table 1 discussed previously.

Based on the further design language representation 604, the co-pilot design system 106 uses the generative language model 312 for predicting tokens corresponding to a further digital design document 606. As discussed above in relation to FIG. 5, the co-pilot design system 106 performs attribute suggestion by predicting one or more attribute values for attributes of tokenized elements. In particular embodiments, the generative language model 312 accounts for the previous placement of elements and their attributes as represented in the further design language representation 604.

In certain implementations, at each iteration, the generative language model 312 generates a new probability distribution conditioned by the current, unfinished token phrase (e.g., in the further design language representation 604). Accordingly, in one or more embodiments, the co-pilot design system 106 samples an attribute value from the newly generated probability distribution to complete a token description for one or more elements represented in the further design language representation 604.

Additionally or alternatively, the generative language model 312 performs layout alternatives. In this example, the co-pilot design system 106 does not perform the act 602. Rather, the co-pilot design system 106 iterates on the previous design without user-added content. Accordingly, in one or more embodiments, the generative language model 312 predicts element tokens with some (or none) of the attributes for the title 403b and elements 508a-508d of the additional digital design document 506.

Further, in some embodiments, the generative language model 312 predicts tokens for entirely new digital design elements. For example, the generative language model 312 predicts a next token element or a companion element token (e.g., for a digital design element typically associated with digital design elements currently represented by the further design language representation 604).

Subsequently, the co-pilot design system 106 uses a decoder to generate the further digital design document 606 based on the predicted tokens from the generative language model 312 (e.g., in a same or similar manner as discussed above). As depicted in the further digital design document 606, the co-pilot design system 106 captures multiple design variations. For example, the co-pilot design system 106 centers the title 403b and changes the text font. The co-pilot design system 106 further changes the font size and frame of the text 508a, 508c. In addition, the co-pilot design system 106 changes the frame of the shape 508d.

Although multiple design variations are shown in FIG. 6, it will be appreciated that the co-pilot design system 106 can perform a single design variation per iteration. Further, in one or more embodiments, the co-pilot design system 106 performs more than two iterations, without limitation.

As mentioned above, the co-pilot design system 106, in one or more embodiments, trains a generative language model to efficiently and accurately generate predicted tokens. For example, FIG. 7 illustrates the co-pilot design system 106 training the generative language model 312 to generate predicted tokens in accordance with one or more such embodiments.

Figure 7:
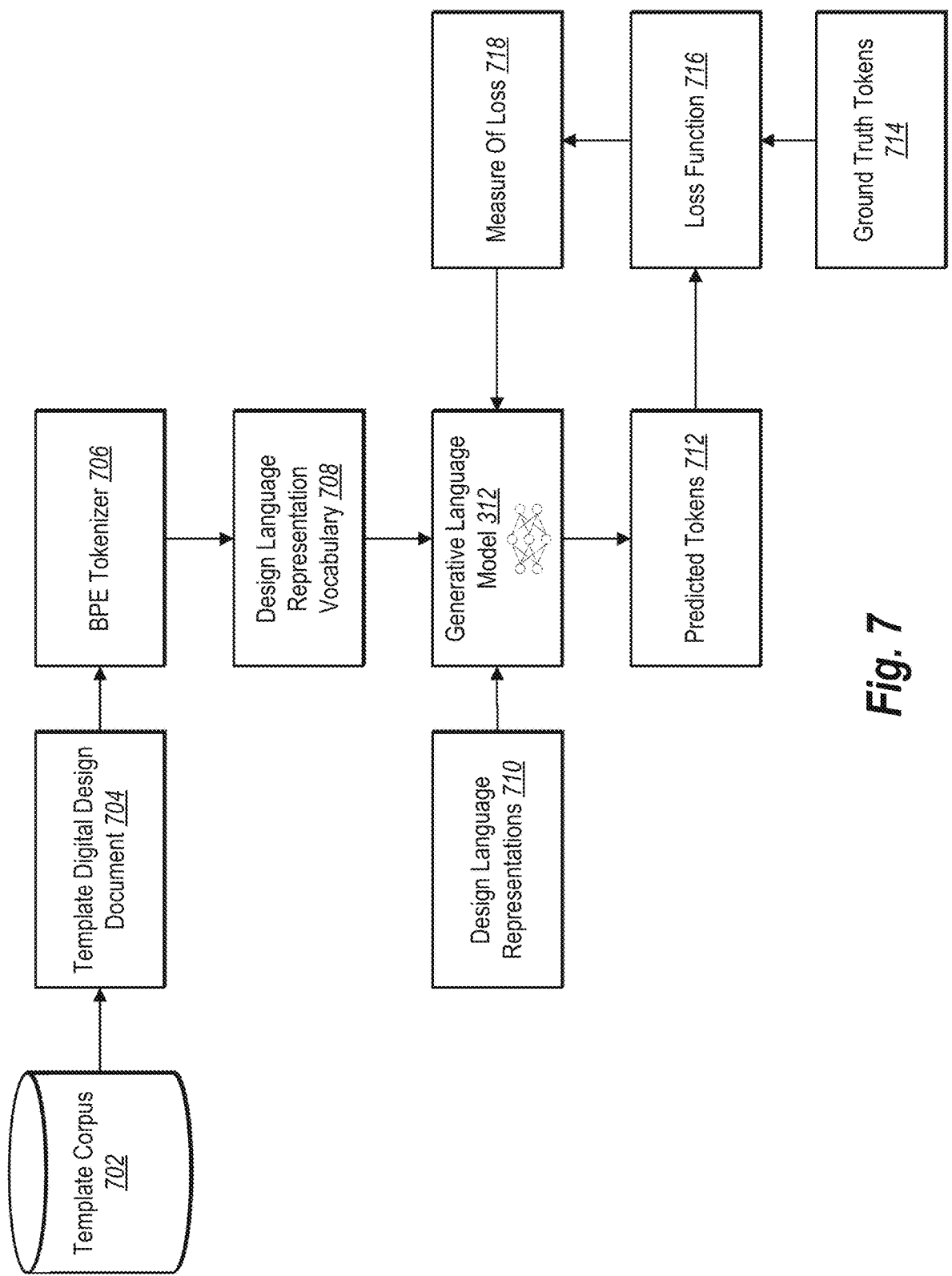
FIG. 7 illustrates a co-pilot design system training a generative language model to generate predicted tokens in accordance with one or more embodiments.

As shown in FIG. 7, the co-pilot design system 106 uses a template corpus 702 to provide template digital design documents 704. In one or more embodiments, the template corpus 702 comprises a database of template digital design documents (e.g., ADOBE® SPARK templates, .pdf documents, .pptx documents) with pre-populated or completed content. In certain implementations, the template corpus 702 comprises a collection of approximately 60,000 digital design documents with highly varied entries. Further, in some embodiments, the template corpus 702 comprises modified or synthetic digital design documents (e.g., vertically and/or horizontally flipped design documents) for more robust training.

The co-pilot design system 106 generates a design language representation vocabulary 708 by utilizing a BPE tokenizer 706 to tokenize background information and elements of the template digital design documents 704 (e.g., based on the template abstraction language of Table 1 described above). In particular embodiments, the BPE tokenizer 706 performs sub-word tokenization, which means splitting the words into the composing parts to achieve a smaller vocabulary. As a conceptual example, instead of keeping "father," "mother," "fatherhood" and "motherhood," the BPE tokenizer 706 would only keep "father," "mother" and the suffix "hood." For this reason, the BPE tokenizer 706 is particularly useful for fonts.

For instance, font names are composed of a font family and a font type. Accordingly, the BPE tokenizer 706 generates the design language representation vocabulary for fonts by maintaining the font families and the font types independently. For example, the co-pilot design system 106 can avoid over-expanding the design language representation vocabulary with separate instances for font names from similar families (such as Gill Sans, Gill Sans Light, Gill Sans MT, etc.). In particular embodiments, this approach greatly limits the size of the design language representation vocabulary for fonts, which is desirable because the design language representation vocabulary 708 can include a significant number of fonts. In certain implementations, this reduced vocabulary size lends to an improved probability distribution.

As shown in FIG. 7, the co-pilot design system 106 generates design language representations 710 for providing to the generative language model 312. In particular embodiments, the co-pilot design system 106 generates the design language representations 710 by generating a dataset of design language representations that represent various types and configurations of elements and backgrounds for digital design documents from the template corpus 702. Additionally or alternatively, the co-pilot design system 106 generates the design language representations 710 by translating one or more training design documents (e.g., ADOBE® SPARK training documents) that portray a template to design language representations according to a template abstraction language discussed above in relation to Table 1. In certain cases, user-accepted design variations can be added to template digital design documents.

Based on the design language representations 710 and the design language representation vocabulary 708, the generative language model 312 generates predicted tokens 712. The predicted tokens 712 comprise tokens for attribute values, attributes, and/or elements. In certain implementations, the predicted tokens 712 comprise a next token or a missing token as a design variation to a corresponding design language representation. In at least some embodiments, the co-pilot design system 106 predicts a token (e.g., a first predicted token, pred_tk1) based on nothing. Subsequently, the co-pilot design system 106 uses the generative language model 312 to predict another token (e.g., a second predicted token, pred_tk2, based on a first ground truth token). Further, the co-pilot design system 106 uses the generative language model 312 to predict yet another token (e.g., a third predicted token, pred_tk3 based on the first ground truth token and a second ground truth token). In these or other embodiments, the predicted tokens are not tokens per se, but instead represent probability distributions over the design language representation vocabulary 708. That is, in one or more embodiments, the generative language model 312 predicts a probability for one or more tokens (e.g., each token) in the design language representation vocabulary 708.

In addition, the co-pilot design system 106 uses ground truth tokens 714 for comparing to the predicted tokens 712. In one or more embodiments, the ground truth tokens 714 comprise annotations, labels, or other ground truth data. For example, the ground truth tokens 714 comprise the tokens for an observed or actual next design variation (e.g., a next user-added element or a next user-defined attribute value). In some embodiments, the predicted tokens 712 represent probability distributions, and the ground truth tokens 714 represent actual tokens. The co-pilot design system 106 compares a predicted distribution to the true distribution (1 for the real token, 0 for the rest) using cross-entropy as the loss function 716. Thus, in certain implementations, the goal is to get the probability distribution as close to the real probability distribution as possible.

In particular embodiments, the co-pilot design system 106 compares the predicted tokens 712 and the ground truth tokens 714 utilizing a loss function 716. The loss function 716 returns quantifiable data (e.g., a measure of loss 718) regarding the difference between a given predicted token from the predicted tokens 712 and a corresponding ground truth token from the ground truth tokens 714. In particular embodiments, the loss function 716 comprises a regression loss function (e.g., a mean square error function, a quadratic loss function, an L2 loss function, a mean absolute error/L1 loss function, mean bias error). Additionally, or alternatively, the loss function 716 includes a classification-type loss function (e.g., a hinge loss/multi-class SVM loss function, cross entropy loss/negative log likelihood function).

The co-pilot design system 106 uses one or more different training parameters and configurations associated with the loss function 716. For example, in certain training instances, the co-pilot design system 106 implements a learning rate of 1e-4 and a batch size of 2*number of devices. Additionally, in one or more embodiments, the co-pilot design system 106 implements an Adam optimizer, a linear learning rate decay with warmup and cross entropy as a loss function. In certain embodiments, the co-pilot design system 106 trains for 500,000 steps instead of a fixed number of epochs. In at least some embodiments, the training process takes 37 hours on a machine with 4 V100 GPUs.

Based on the measure of loss 718, the co-pilot design system 106 updates one or more learned parameters for the generative language model 312. In particular embodiments, the co-pilot design system 106 adjusts various parameters to improve the quality/accuracy of the predicted tokens 712 in subsequent training iterations—by narrowing the difference between the predicted tokens 712 and the ground truth tokens 714 in subsequent training iterations (e.g., via back propagation).

In one or more embodiments, experimenters have observed that the measure of loss 718 decreases sharply from 1.61 to 0.1 in the first 20,000 steps, and then steadily until it reaches a value of 0.0073 at the $250,000^{th}$ step. In certain instances, experimenters observed that the co-pilot design system 106 continues the training for 250,000 more steps to reach a final loss of 0.0049.

As discussed above, certain embodiments of the co-pilot design system 106 utilize a user interface for intuitively interacting with a digital design document to generate modified digital design documents with design variations. Alternatively, one or more embodiments of the co-pilot design system 106 utilize a user interface to generate a design from scratch. In accordance with one or more such embodiments, FIGS. 8A-8I illustrate graphical user interfaces 802a-802i of a client device 800 for generating and displaying digital design documents with design variations.

Figure 8A:
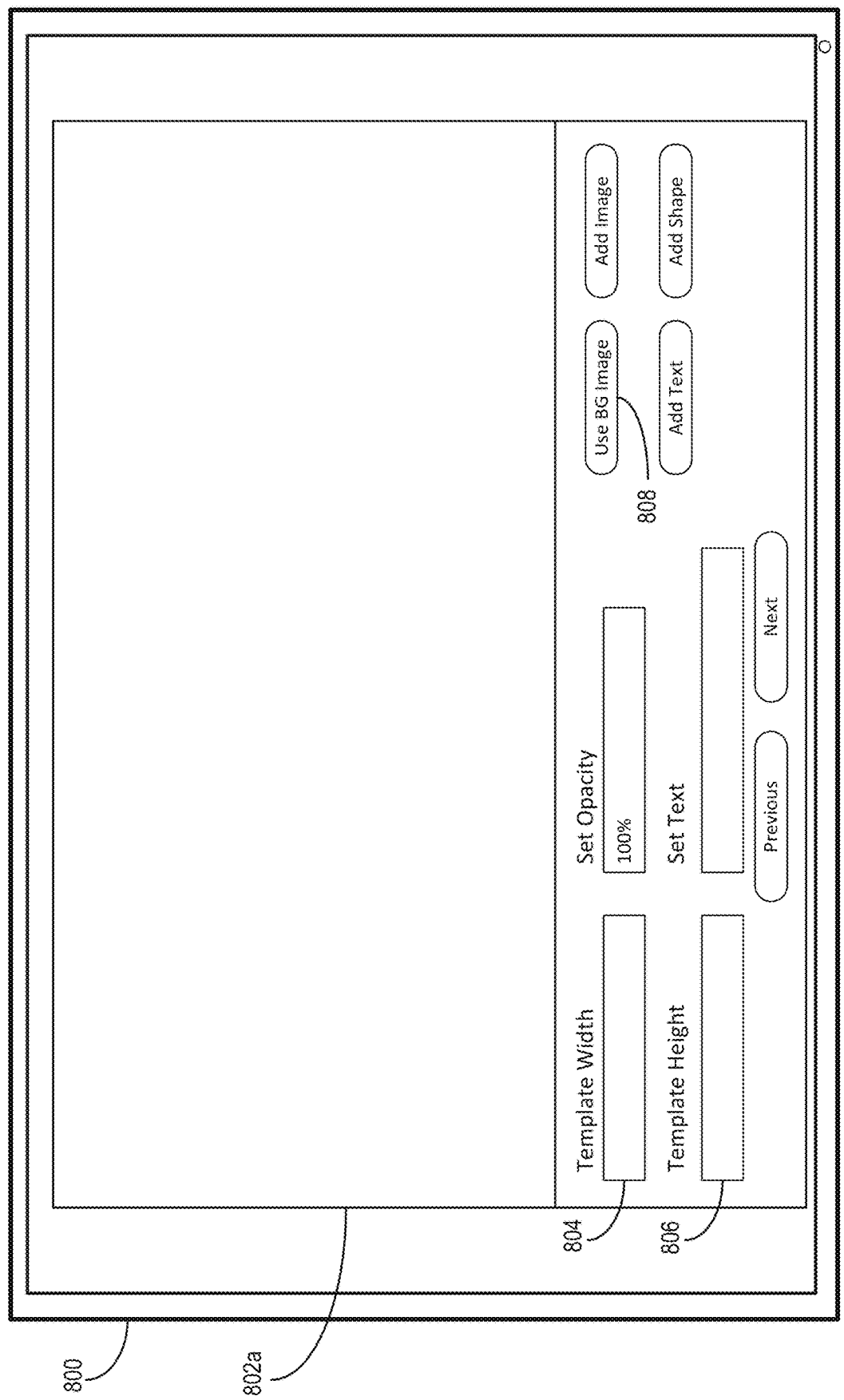
FIGS. 8A-8I illustrate graphical user interfaces of a client device for generating and displaying digital design documents with design variations in accordance with one or more embodiments.

As shown in FIG. 8A, the co-pilot design system 106 causes the client device 800 to instantiate the graphical user interface 802a for design creation. In particular, the graphical user interface 802a comprises template sizing fields 804, 806 to size a digital canvas for beginning the design process from scratch. In addition, the graphical user interface 802a comprises a background image selection element 808 for beginning the design process by selecting a digital image.

Figure 8B:
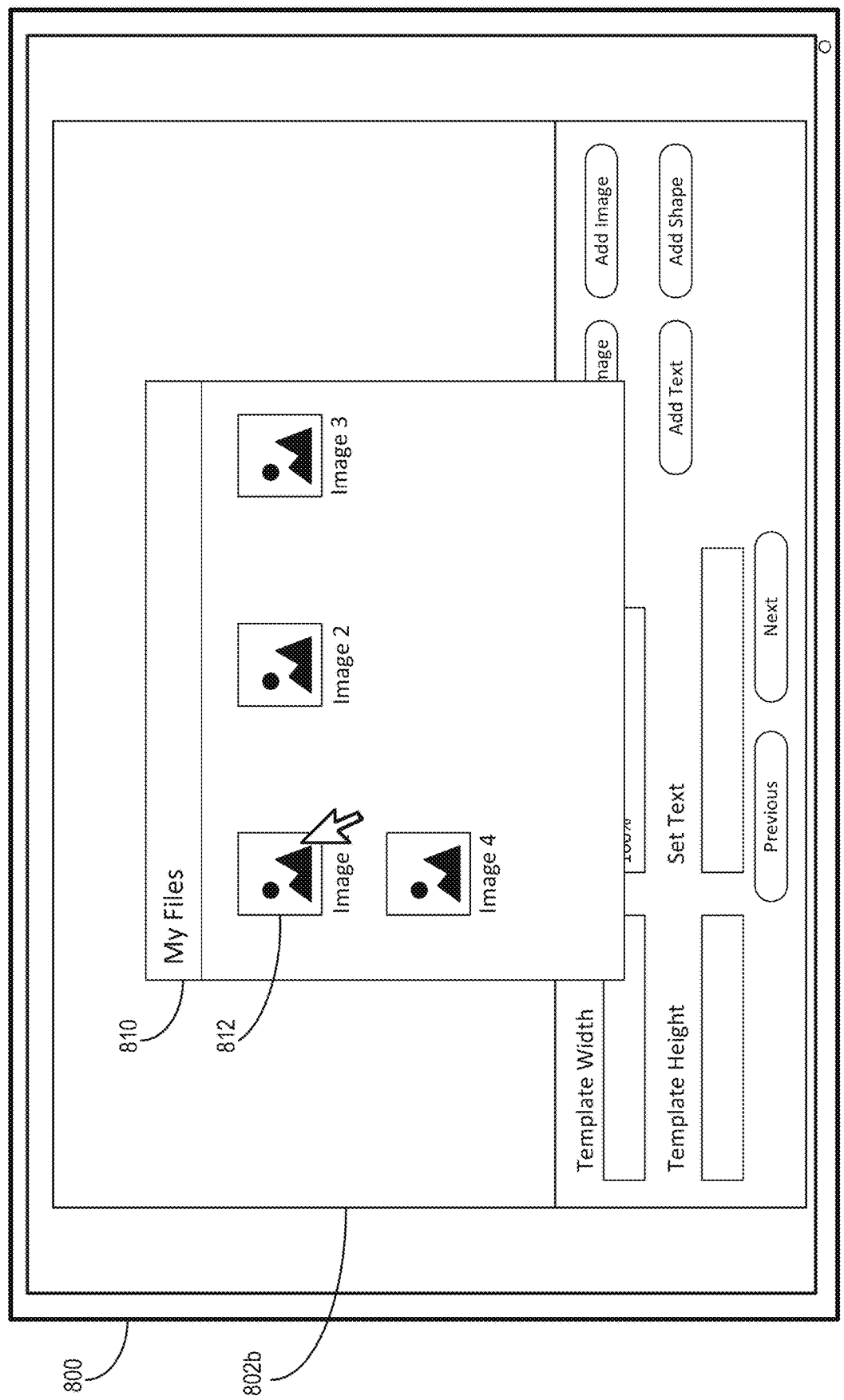

In the user interface 802b of FIG. 8B, the co-pilot design system 106 instantiates a selection window 810 in response to detecting a user input with respect to the image selection element 808 in FIG. 8A. Upon instantiating the selection window 810, the co-pilot design system 106 provides one or more images—including a digital image 812—for uploading as a template background.

Figure 8C:
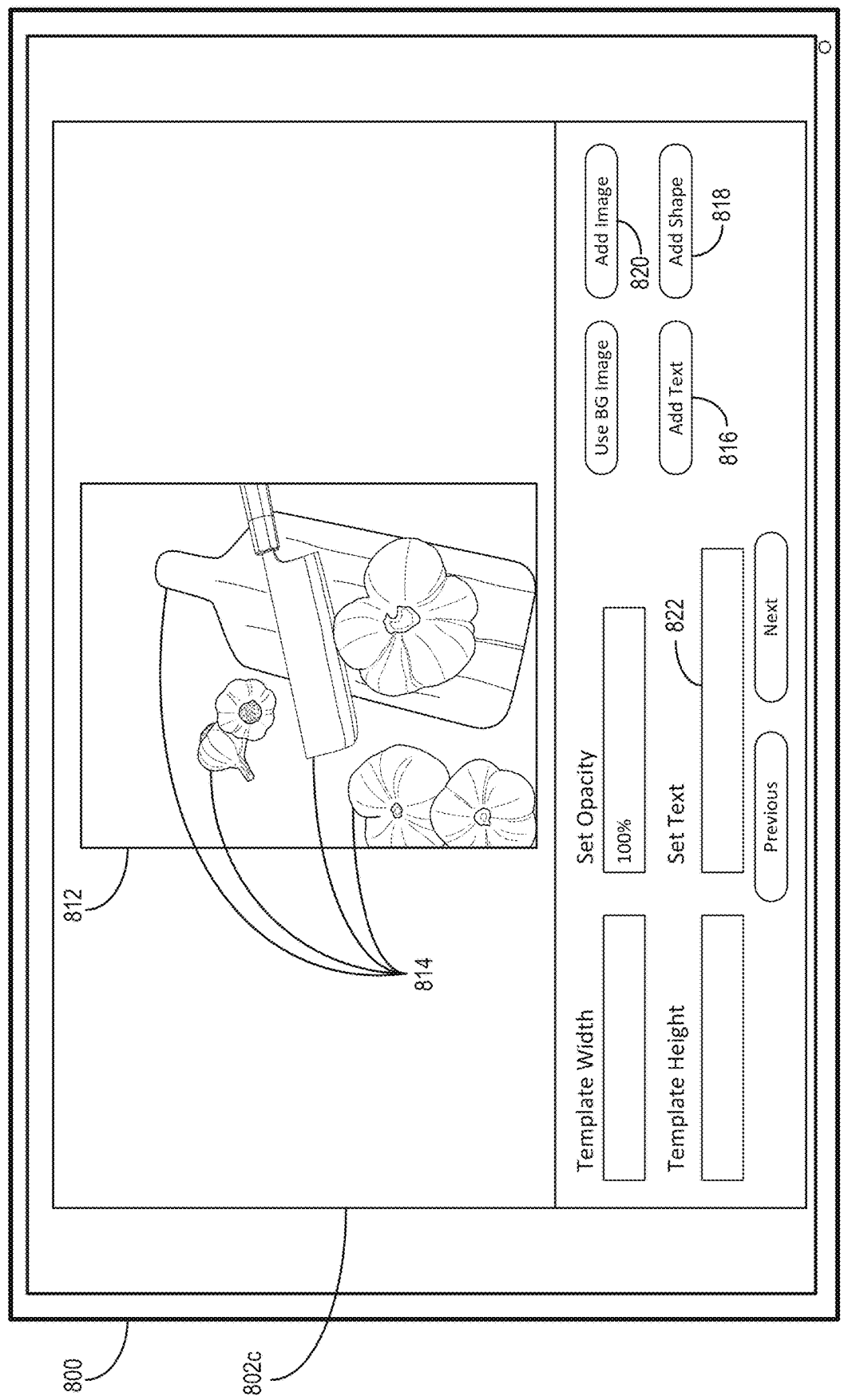

As shown in the user interface 802c of FIG. 8C, the co-pilot design system 106 provides the digital image 812 for display in response to a user selection in FIG. 8B. In response to receiving the digital image 812, the co-pilot design system 106 utilizes a language abstraction model to extract information regarding the digital image 812. In particular, the co-pilot design system 106 utilizes a language abstraction model to extract and tokenize background object information regarding background objects 814. In addition, the co-pilot design system 106 utilizes a language abstraction model to determine and tokenize copyspace information for the 812. From each of the generated tokens, the co-pilot design system 106 generates a design language representation for the template background portrayed in the digital image 812.

The user interface 802c further comprises design controls 816-820. User interaction with the design control 816 causes the co-pilot design system 106 to add a text element to the digital image 812. The text element comprises text indicated via user input to a text field 822. In addition, user interaction with the design control 818 causes the co-pilot design system 106 to add a user-selected shape to the digital image 812. Further, user interaction with the design control 820 causes the co-pilot design system 106 to add a user-selected image to the digital image 812.

Figure 8D:
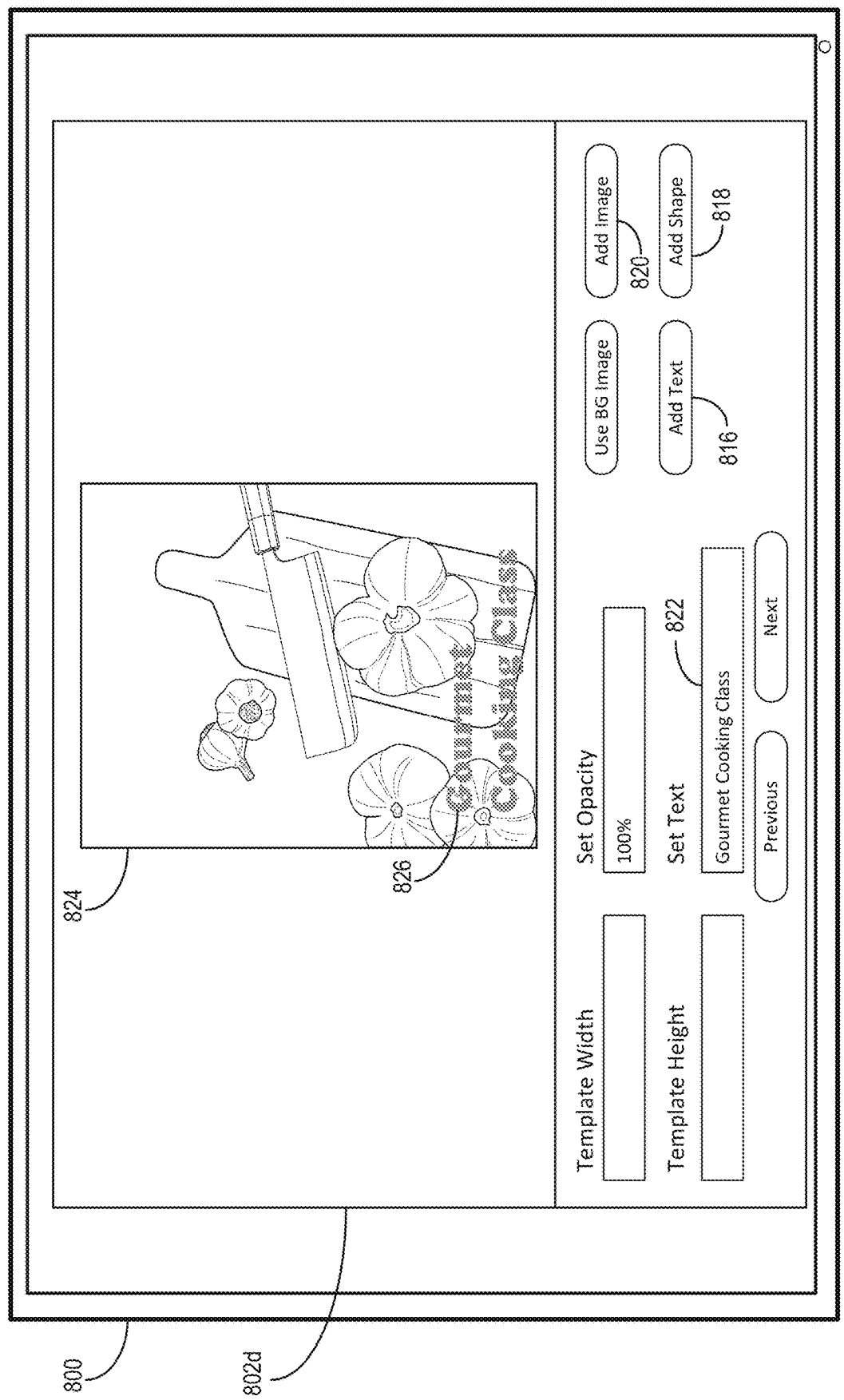

In the user interface 802d of FIG. 8D, the co-pilot design system 106 renders an additional digital design document 824. In particular, the additional digital design document 824 comprises a text element 826 with text "Gourmet Cooking Class" as indicated according to the text field 822.

To generate the additional digital design document 824, the co-pilot design system 106 performs one or more acts described above in relation to the foregoing figures. For example, the co-pilot design system 106 uses a language abstraction model to tokenize the added text "Gourmet Cooking Class." The co-pilot design system 106 combines the text token for the user-added text and the background tokens previously generated in a design language representation.

Subsequently, the co-pilot design system 106 uses a generative language model to predict one or more tokens based on the design language representation. In one or more embodiments, the generative language model predicts tokens for attribute values of the user-added text "Gourmet Cooking Class." To illustrate, the generative language model predicts tokens that provide one or more of an opacity value, a filter value, a blur value, etc. From the predicted tokens, the co-pilot design system 106 utilizes a decoder to render the additional digital design document 824 with the text element 826 displayed in a manner according to the predicted attribute values. Thus, a user may indicate the text to add, but the co-pilot design system 106 predicts one or more designs of how to show the requested text.

Figure 8E:
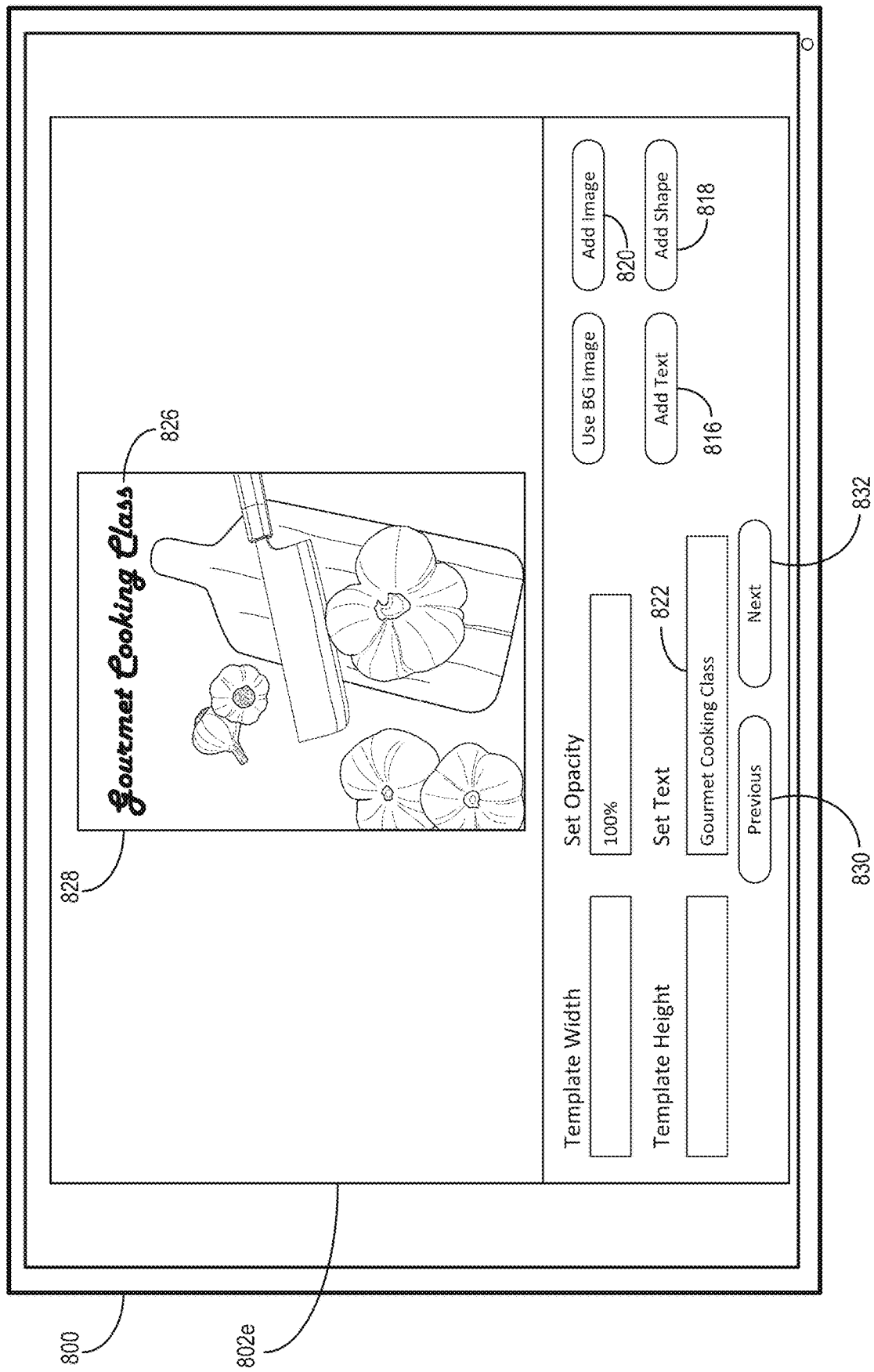

In FIG. 8E, the user interface 802e comprises iteration controls 830, 832. Interaction with the iteration control 830 causes the co-pilot design system 106 to revert back to a previous design. By contrast, interaction with the iteration control 832 causes the co-pilot design system 106 to generate a next design variation. As discussed previously, the next design variation can include a next suggested attribute value, a new attribute, and/or an entire new element. For instance, the next design variation includes all different attribute values for the current element.

Moreover, as shown in FIG. 8E, the co-pilot design system 106 generates an additional digital design document 828 comprising a design variation (e.g., darkened text, changed frame, and different font) to the text element 826.

Specifically, the co-pilot design system 106 generates the additional digital design document 828 in response to detecting a user interaction with the iteration control 832. To do so, in one or more embodiments, preserves some (or none) of the attribute values for the text token. For example, the co-pilot design system 106 provides another design language representation to a generative language model by combining the prior inputs and the prior user-accepted outputs (e.g., the predicted token from the prior element's iteration(s) and a prior design language representation). The generative language model then uses the additional design language representation to generate a new predicted text token that varies one or more of the previous text attributes. Based on the new predicted text token, the co-pilot design system 106 renders the additional digital design document 828 using a decoder.

Figure 8F:
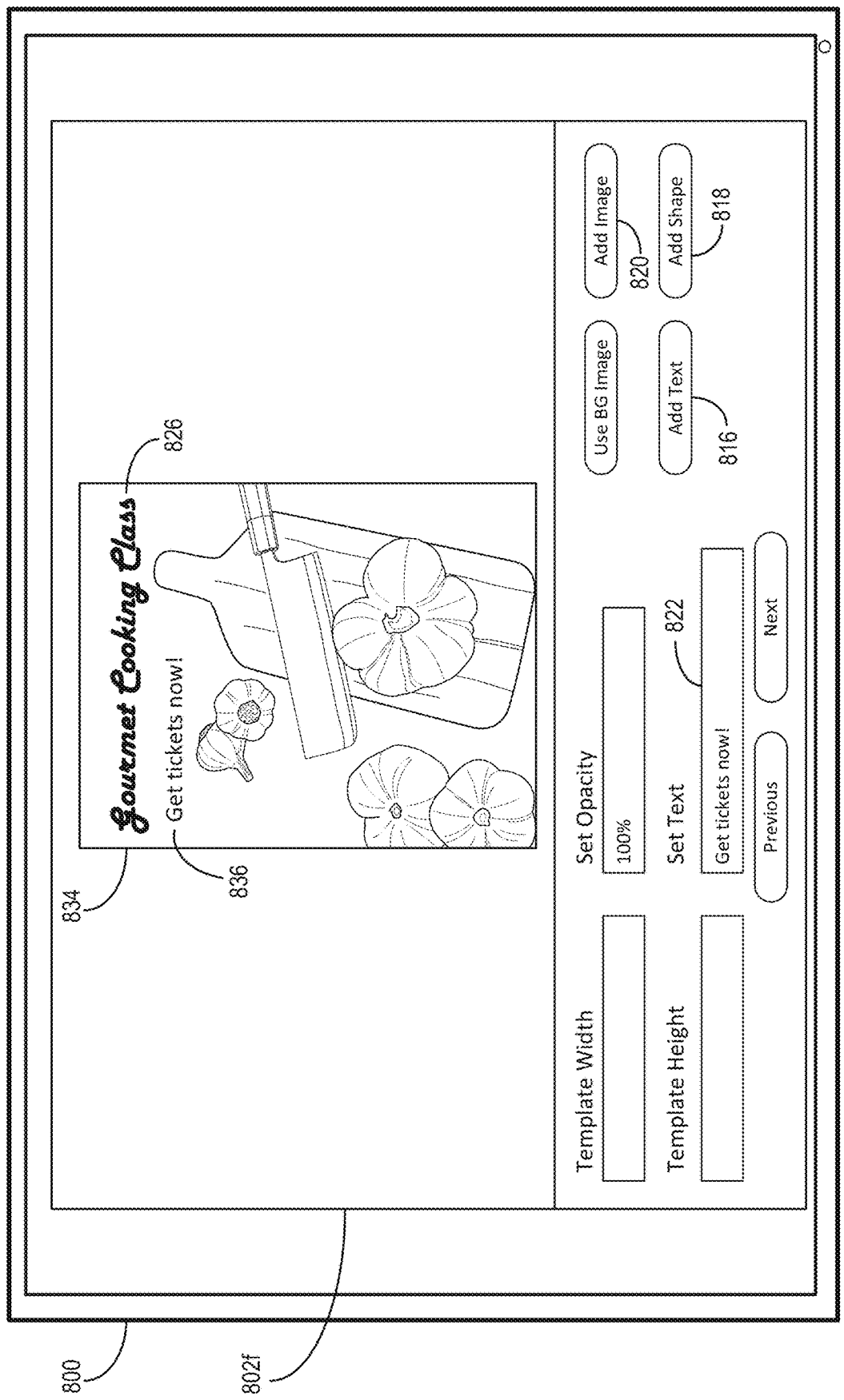

In FIG. 8F, the user interface 802f comprises an additional digital design document 834. As shown, the additional digital design document 834 comprises a text element 836 added in response to user interaction with the design control 816 to provide the indicated text "Get tickets now!" from the text field 822. The co-pilot design system 106 adds the text element 836 in a same manner as discussed above in relation to FIG. 8D for adding the text element 826.

Figure 8G:
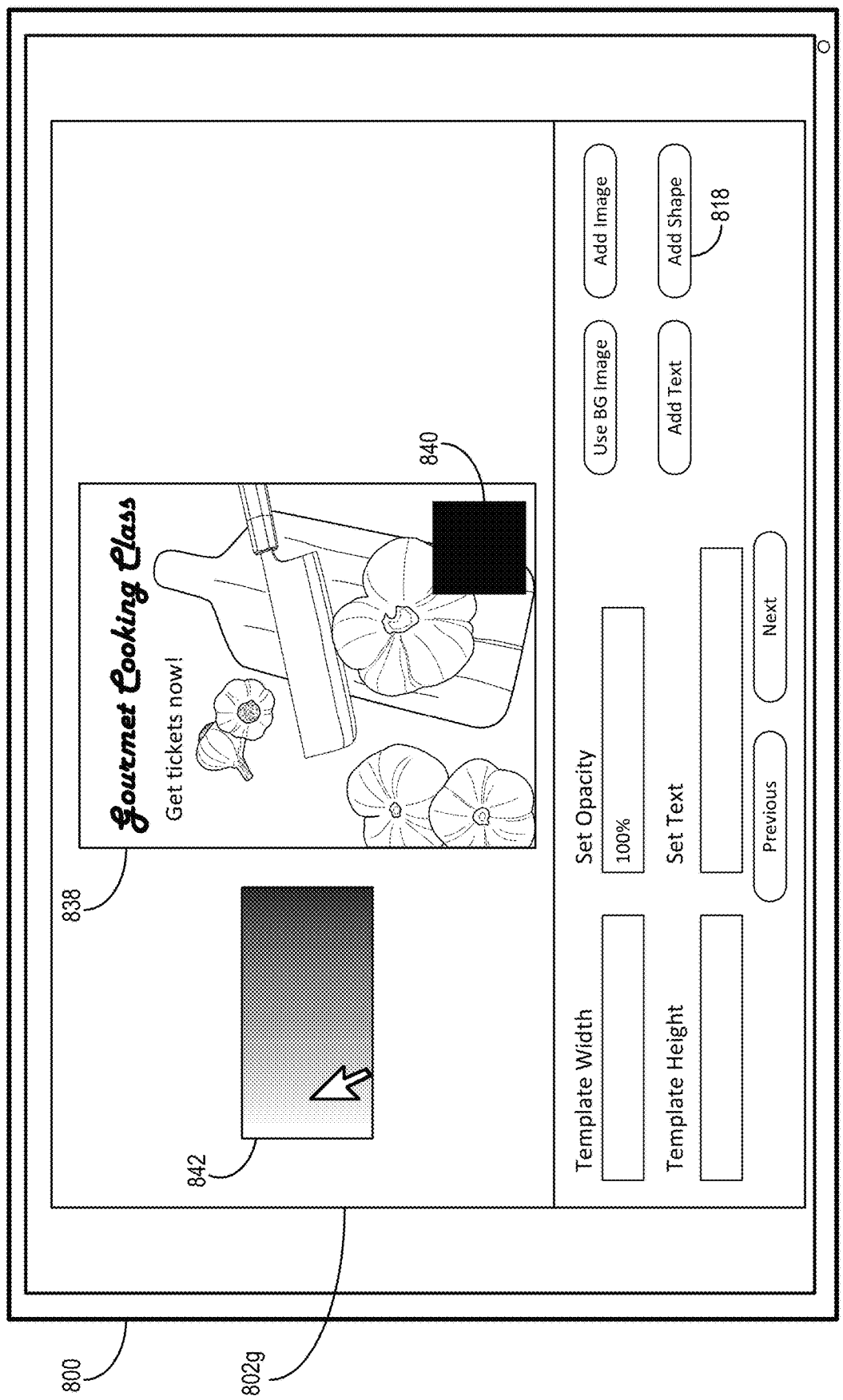

In FIG. 8G, the user interface 802g comprises an additional digital design document 838. The additional digital design document 838 comprises a shape element 840 added in response to user interaction with the design control 818 to provide an uploaded, selected, or digitally drawn square shape.

To generate the additional digital design document 838 with the shape element 840, the co-pilot design system 106 uses a language abstraction model to tokenize the added square. The co-pilot design system 106 combines the shape token for the user-added square and the prior design language representation. Subsequently, the co-pilot design system 106 uses a generative language model to predict one or more tokens. In one or more embodiments, the generative language model predicts tokens for attribute values of the user-added square. To illustrate, the generative language model predicts tokens that provide one or more of a frame, color, or opacity. From the predicted tokens, the co-pilot design system 106 utilizes a decoder to render the additional digital design document 838 with the shape element 840 displayed in a manner according to the predicted attribute values. In this case, the co-pilot design system 106 predicted attribute values of a solid fill, black color, and bottom-right frame for the shape element 840.

Further shown in FIG. 8G, the user interface 802g comprises a color control 842. In one or more embodiments, the co-pilot design system 106 provides the color control 842 for display upon surfacing the shape element 840. In this manner, the co-pilot design system 106 flexibly provides user options to change the predicted color for the shape element 840 (or else leave the predicted color in place).

Figure 8H:
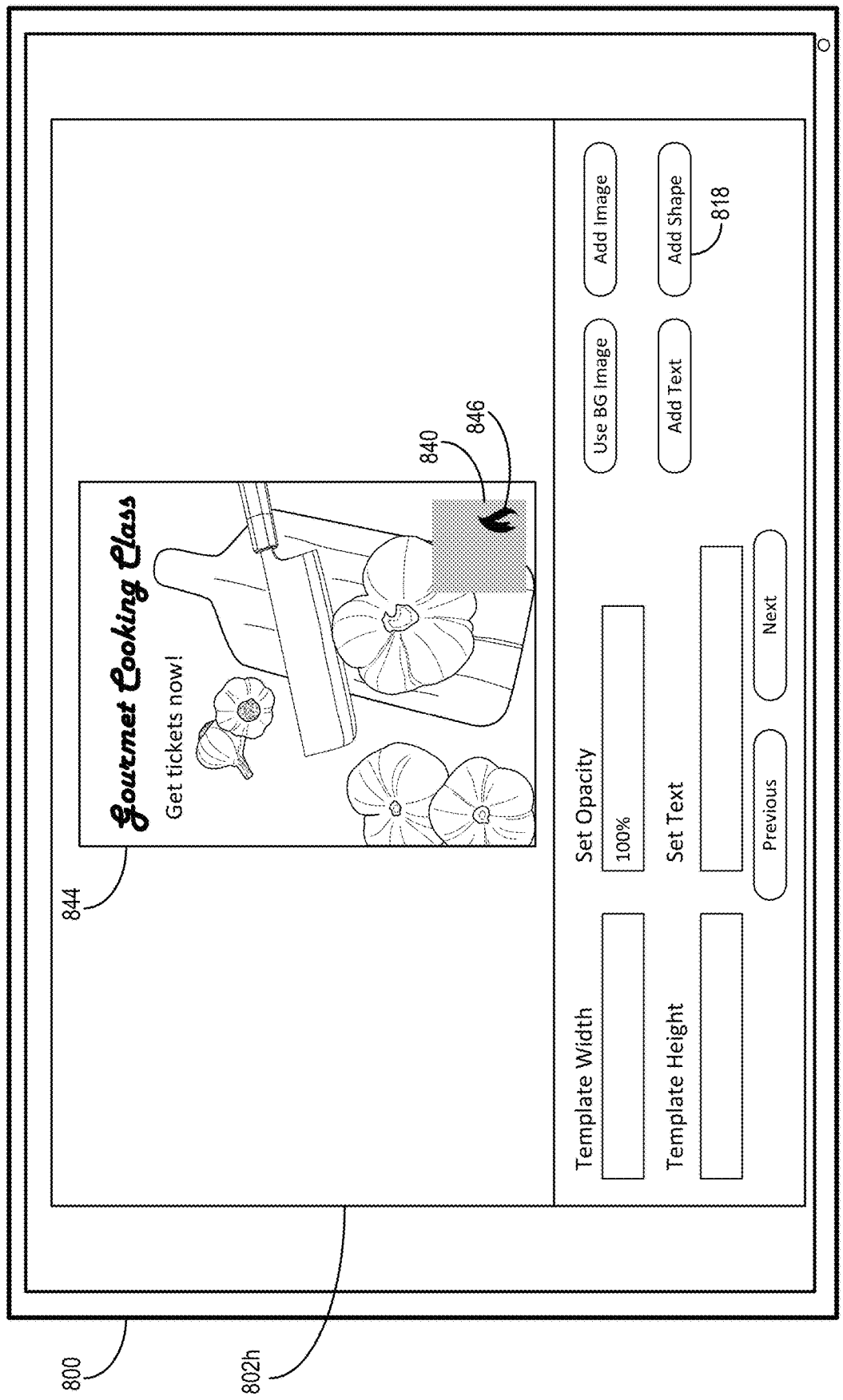

In FIG. 8H, the user interface 802h comprises an additional digital design document 844. As shown, the additional digital design document 844 comprises the shape element 840 with a changed color responsive to user input via the color control 842 discussed above. Additionally shown, the additional digital design document 844 comprises a shape element 846 superimposed on top of the shape element 840. The co-pilot design system 106 adds the shape element 846 in a same manner as discussed above in relation to FIG. 8G for adding the shape element 840.

Figure 8I:
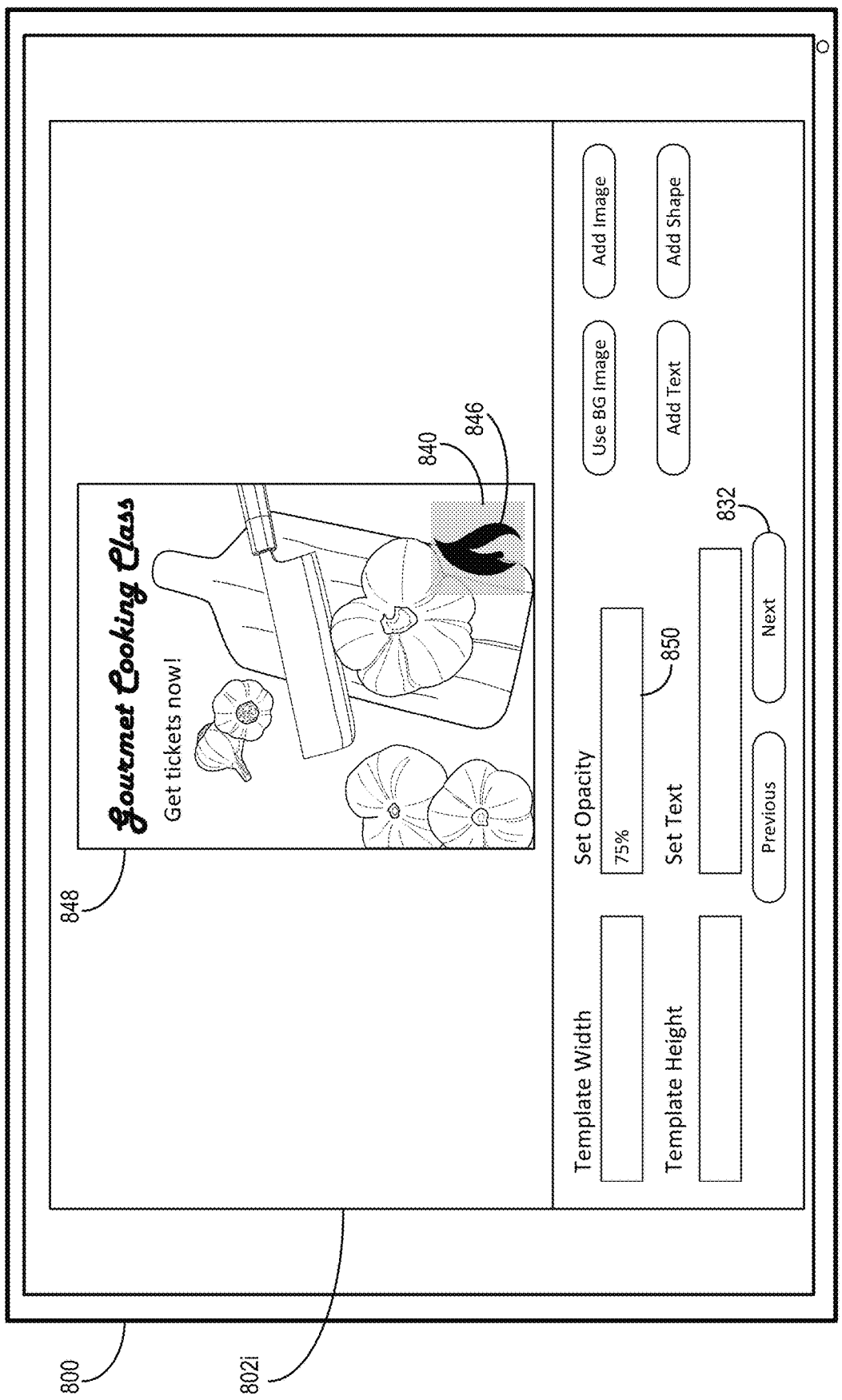

In FIG. 8I, the co-pilot design system 106 generates an additional digital design document 848 comprising a design variation (e.g., enlarged size and frame change) to the shape element 846. Specifically, the co-pilot design system 106 generates the additional digital design document 848 in response to detecting a user interaction with the design control 832. To do so, in one or more embodiments, preserves some (or none) of the attribute values for the token corresponding to the shape element 846. In particular, the co-pilot design system 106 provides the prior design language representation combined with the last predicted token to generate a new predicted shape token that varies one or more of the previous flame shape attributes. Based on the new predicted shape token, the co-pilot design system 106 renders the additional digital design document 848 using a decoder.

Although not illustrated, the co-pilot design system 106 can also include selectable elements that allow for selection of what digital design elements/attributes/attribute values to change and/or what digital design elements/attributes/attribute values to hold fixed (e.g., remain the same). Thus, for example, the user interface 802i can include selectable elements that, when selected, cause the shape element 846 to remain fixed. Similarly, the user interface 802i can include selectable elements that, when selected, cause one or more attributes of the shape element 846 to remain fixed (e.g., the size the shape element 846 will not change). Moreover, the user interface 802i can include selectable elements that, when selected, cause other attributes to change (e.g., the color of the shape element 846 can change). Accordingly, the co-pilot design system 106 can identify design elements, attributes, and/or attribute values to hold fixed or change based on user interaction with one or more selectable elements of a user interface.

Additionally, in one or more embodiments, the co-pilot design system 106 receives user inputs to directly manipulate an image. The co-pilot design system 106 receives these user manipulations at one or more different times. Moreover, the co-pilot design system 106 need not provide such user manipulations to the generative language model in order to implement the desired change. For example, in response to user interaction with an opacity control 850, the co-pilot design system 106 reduces an opacity of a selected element (in this case, the shape element 840) to 75%. It will be appreciated that, for a subsequent iteration, the co-pilot design system 106 uses the language abstraction model to reflect such user manipulations (e.g., changed opacity) in a subsequent design language representation.

Although FIGS. 8A-8I illustrate one example sequence of design iterations, it will be appreciated that the co-pilot design system 106 can implement myriad different sequences of design iterations with a host of different operations executable according to the various design and iteration controls.

Figure 9:
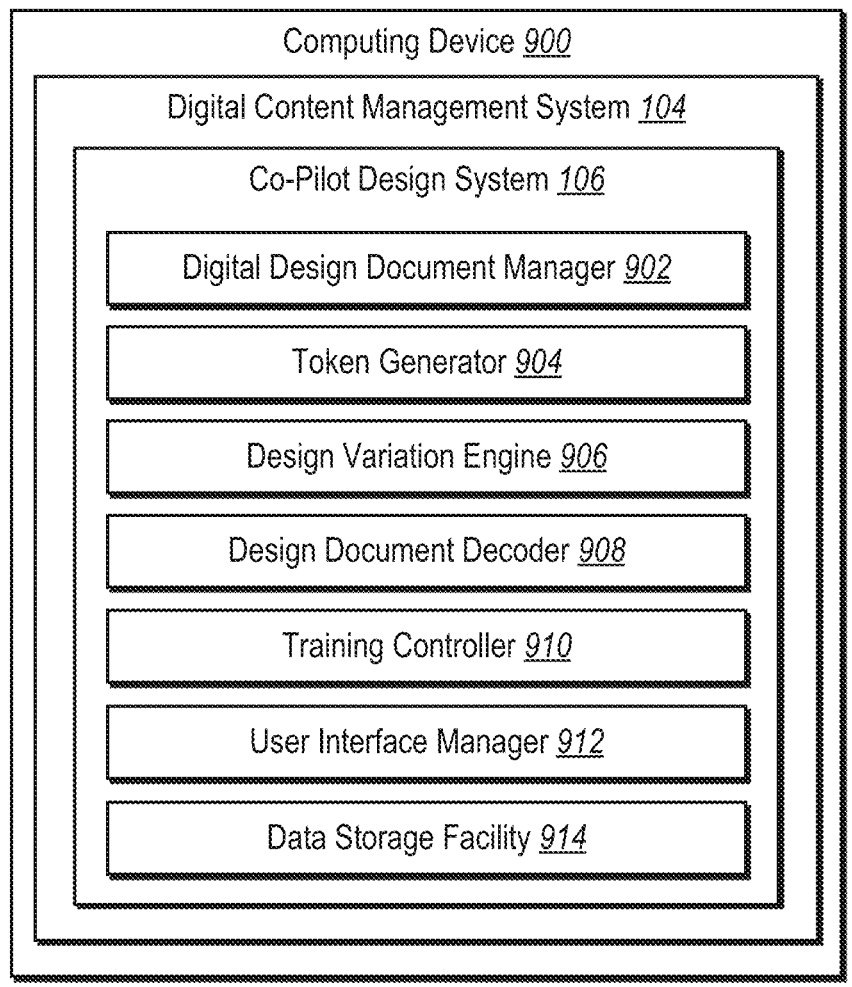
FIG. 9 illustrates a schematic diagram of an example architecture of the co-pilot design system in accordance with one or more embodiments.

Turning to FIG. 9, additional detail will now be provided regarding various components and capabilities of the co-pilot design system 106. In particular, FIG. 9 illustrates an example schematic diagram of a computing device 900 (e.g., the server(s) 102 and/or the client device 108) implementing the co-pilot design system 106 in accordance with one or more embodiments of the present disclosure. As shown, the co-pilot design system 106 is implemented by the digital content management system 104. Also illustrated, the co-pilot design system 106 includes a digital design document manager 902, a token generator 904, a design variation engine 906, a design document decoder 908, a training controller 910, a user interface manager 912, and a data storage facility 914.

The digital design document manager 902 transmits, stores, requests, or receives digital design documents (as described in relation to the foregoing figures). For example, the digital design document manager 902 can receive digital design documents via user upload of digital design documents. As mentioned above, in some implementations the co-pilot design system 106 can generate a digital design document (without first receiving a digital design document). The digital design document manager 902 can receive user input for generating a digital design document.

The token generator 904 generates a design language representation of a digital design document by tokenizing digital design elements (and/or other template information) as described in relation to the foregoing figures. Additionally, the token generator 904 generates a design language representation of user-added content (e.g., text, shapes, or images). In one or more embodiments, the token generator 904 comprises a language abstraction model.

The design variation engine 906 generates additional design language representations by predicting one or more tokens (as described in relation to the foregoing figures). In particular embodiments, the design variation engine 906 comprises a generative language model (e.g., a transformer neural network) that predicts a next token or a missing token based on a given design language representation. In one or more embodiments, the predicted token corresponds to a suggested design variation.

The design document decoder 908 renders an additional digital design document from an additional design language representation (as described in relation to the foregoing figures). In particular embodiments, the design document decoder 908 parses text of an additional design language representation (e.g., in JSON format) to render an additional digital design document with a design variation.

The training controller 910 generates updates, trains, or learns one or more parameters of the design variation engine 906 (as described in relation to the foregoing figures). In particular embodiments, the training controller 910 uses a BPE tokenizer to generate a design language representation vocabulary based on template digital design documents from a template corpus. Further, in certain embodiments, the training controller 910 learns parameters for the design variation engine 906 based on a measure of loss quantifying a difference between a predicted token and a ground truth token.

In one or more embodiments, the user interface manager 912 provides, manages, and/or controls a graphical user interface (or simply "user interface"). In particular embodiments, the user interface manager 912 generates and displays a user interface by way of a display screen composed of a plurality of graphical components, objects, and/or elements that allow a user to perform a function. For example, the user interface manager 912 receives user inputs from a user, such as a click/tap to upload a digital design document, provide user-added content, or request a design variation. Additionally, in one or more embodiments, the user interface manager 912 presents a variety of types of information, including text, enhanced digital design documents, or other information for presentation in a user interface.

The data storage facility 914 maintains data for the co-pilot design system 106. The data storage facility 914 (e.g., via one or more memory devices) maintains data of any type, size, or kind, as necessary to perform the functions of the co-pilot design system 106. For example, the data storage facility 914 stores digital design documents portraying digital design elements (e.g., for user editing). As another example, the data storage facility 914 stores a language abstraction model and a generative language model comprising a transformer neural network.

Each of the components of the computing device 900 can include software, hardware, or both. For example, the components of the computing device 900 can include one or more instructions stored on a computer-readable storage medium and executable by processors of one or more computing devices, such as a client device or server device. When executed by the one or more processors, the computer-executable instructions of the co-pilot design system 106 can cause the computing device(s) (e.g., the computing device 900) to perform the methods described herein. Alternatively, the components of the computing device 900 can include hardware, such as a special-purpose processing device to perform a certain function or group of functions. Alternatively, the components of the computing device 900 can include a combination of computer-executable instructions and hardware.

Furthermore, the components of the computing device 900 may, for example, be implemented as one or more operating systems, as one or more stand-alone applications, as one or more modules of an application, as one or more plug-ins, as one or more library functions or functions that may be called by other applications, and/or as a cloud-computing model. Thus, the components of the computing device 900 may be implemented as a stand-alone application, such as a desktop or mobile application. Furthermore, the components of the computing device 900 may be implemented as one or more web-based applications hosted on a remote server.

The components of the computing device 900 may also be implemented in a suite of mobile device applications or "apps." To illustrate, the components of the computing device 900 may be implemented in an application, including but not limited to, ILLUSTRATOR®, ADOBE® SPARK POST®, PHOTOSHOP®, etc. Product names, including "ADOBE" and any other portion of one or more of the foregoing product names, may include registered trademarks or trademarks of Adobe Inc. in the United States and/or other countries.

Figure 10:
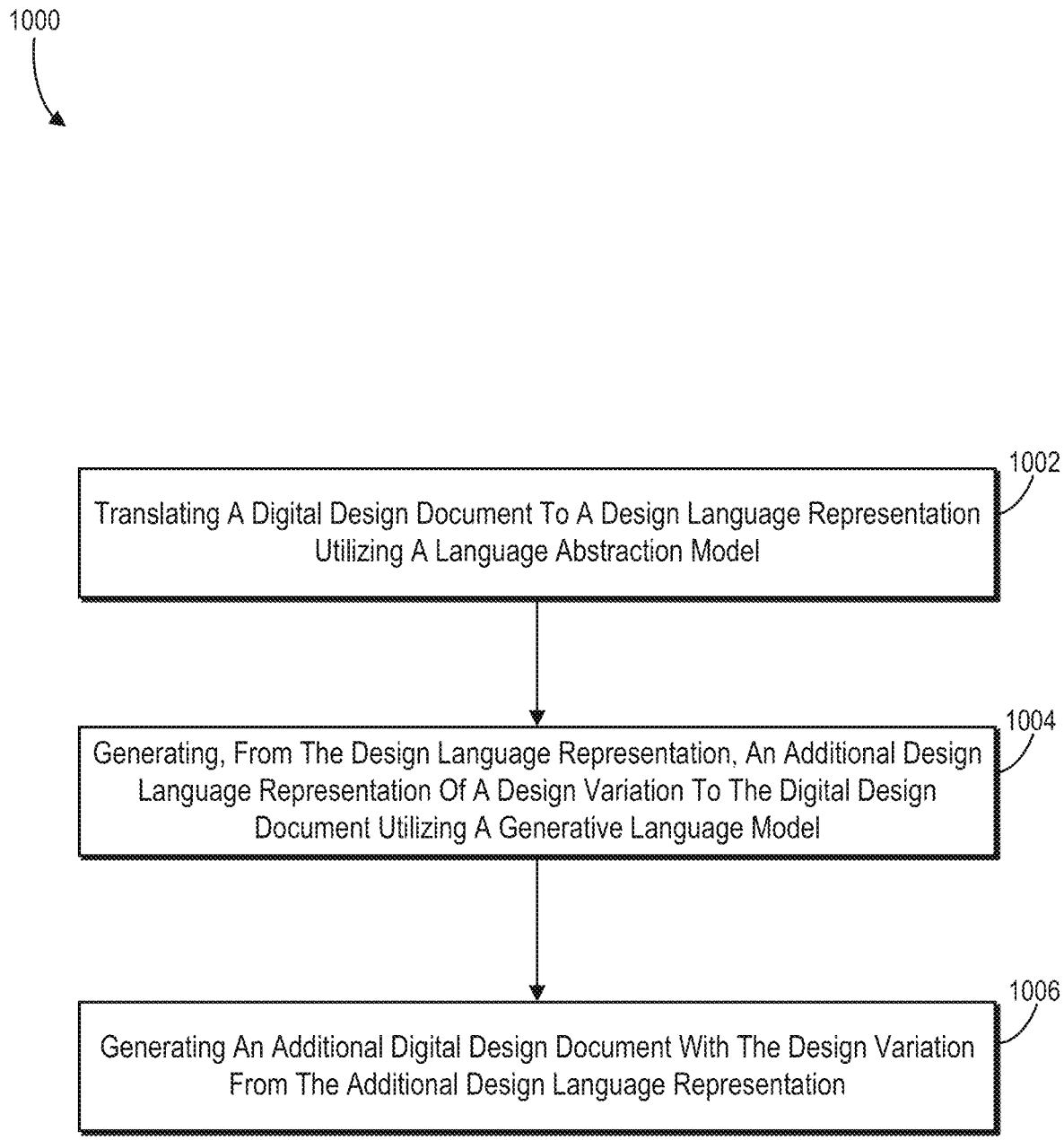
FIG. 10 illustrates a flowchart of a series of acts for generating an additional digital design document with a design variation in accordance with one or more embodiments.

FIGS. 1-9, the corresponding text, and the examples provide several different systems, methods, techniques, components, and/or devices of the co-pilot design system 106 in accordance with one or more embodiments. In addition to the above description, one or more embodiments can also be described in terms of flowcharts including acts for accomplishing a particular result. For example, FIG. 10 illustrates a flowchart of a series of acts 1000 for generating an additional digital design document with a design variation in accordance with one or more embodiments. The co-pilot design system 106 may perform one or more acts of the series of acts 1000 in addition to or alternatively to one or more acts described in conjunction with other figures. While FIG. 10 illustrates acts according to one embodiment, alternative embodiments may omit, add to, reorder, and/or modify any of the acts shown in FIG. 10. In one or more embodiments, the acts of FIG. 10 are performed as part of a method. Alternatively, a non-transitory computer-readable medium comprises instructions that, when executed by one or more processors, cause a computing device to perform the acts of FIG. 10. In some embodiments, a system is configured to perform the acts of FIG. 10.

As shown, the series of acts 1000 includes act 1002 of translating a digital design document to a design language representation utilizing a language abstraction model. In some embodiments, translating the digital design document comprises utilizing the language abstraction model to translate the digital design document to a bounding box token, a background object token, or a background color token of the design language representation.

The series of acts 1000 also includes act 1004 of generating, from the design language representation, an additional design language representation of a design variation to the digital design document utilizing a generative language model. In some embodiments, generating the additional design language representation of the design variation comprises utilizing the generative language model to generate one or more of an image token, a shape token, or a text token of the additional design language representation. In certain implementations, generating the additional design language representation of the design variation comprises utilizing the generative language model to predict, based on the design language representation, one or more attribute values for an attribute of the at least one of the image, the shape, or the text. In one or more embodiments, the attribute comprises an image attribute comprising at least one of a frame, opacity, filter, or blur; a shape attribute comprising at least one of a frame, color, or opacity; or a text attribute comprising at least one of a character count, frame, font, layout, opacity, or color.

In addition, the series of acts 1000 includes act 1006 of generating an additional digital design document with the design variation from the additional design language representation.

It is understood that the outlined acts in the series of acts 1000 are only provided as examples, and some of the acts may be optional, combined into fewer acts, or expanded into additional acts without detracting from the essence of the disclosed embodiments. Additionally, the acts described herein may be repeated or performed in parallel with one another or in parallel with different instances of the same or similar acts. As an example of an additional act not shown in FIG. 10, act(s) in the series of acts 1000 may include act of: receiving one or more user interactions indicating at least one of an image, shape, or text to combine with the digital design document; and translating the at least one of the image, the shape, or the text to the design language representation utilizing the language abstraction model.

As another example of an additional act not shown in FIG. 10, act(s) in the series of acts 1000 may include act of: translating the additional digital design document with the design variation to a further design language representation utilizing the language abstraction model; generating, from the further design language representation, a subsequent design language representation of an additional design variation to the additional digital design document utilizing the generative language model; and generating a subsequent digital design document with the additional design variation from the subsequent design language representation.

As a further example of an additional act not shown in FIG. 10, act(s) in the series of acts 1000 may include act of: providing the additional digital design document for display within a graphical user interface of a client device; and in response to detecting a user interaction requesting the additional design variation to the additional digital design document, providing the subsequent digital design document for display within the graphical user interface of the client device.

In still another example of an additional act not shown in FIG. 10, act(s) in the series of acts 1000 may include act of: translating, utilizing the language abstraction model, the digital design document to a design language representation comprising one or more of a bounding box token, a background object token, or a background color token; generating, from the design language representation, an additional design language representation of a design variation to the digital design elements utilizing the generative language model comprising the transformer neural network, the additional design language representation comprising one or more of an image token, a shape token, or a text token; and generating an additional digital design document with the design variation from the additional design language representation. In some embodiments, the digital design elements comprise an image background and at least one of text or a shape.

Additionally, another example of an additional act not shown in FIG. 10 includes act(s) in the series of acts 1000 of translating the digital design document by utilizing the language abstraction model to tokenize the image background and at least one of the text or the shape into the design language representation.

In another example of an additional act not shown in FIG. 10, act(s) in the series of acts 1000 may include act of translating the digital design document to the design language representation by utilizing the language abstraction model to: generate the bounding box token by tokenizing bounding box data corresponding to copyspace detected in the digital design document; generate the background object token by tokenizing background object data corresponding to at least one of a detected object with a human face or other detected object; or generate the background color token by tokenizing color data detected in the digital design document.

In particular embodiments, an additional act not shown in FIG. 10 includes act(s) in the series of acts 1000 of generating the additional design language representation of the design variation by utilizing the generative language model to generate at least one of: a token for a suggested element to add to the digital design document, wherein the suggested element comprises an image, a shape, or text; or a token for a suggested attribute value for an attribute of either the suggested element or a user-requested element, the user-requested element comprising an image, a shape, or text indicated via a user interaction.

As another example of an additional act not shown in FIG. 10, act(s) in the series of acts 1000 may include act of generating the additional design language representation of the design variation by utilizing the generative language model to predict, based on the design language representation, one or more attribute values for an attribute of at least one of an image, a shape, or text, wherein the attribute comprises: an image attribute comprising at least one of a frame, opacity, filter, or blur; a shape attribute comprising at least one of a frame, color, or opacity; and a text attribute comprising at least one of a character count, frame, font, layout, opacity, or color.

In yet another example of an additional act not shown in FIG. 10, act(s) in the series of acts 1000 may include act of generating the additional design language representation of the design variation by utilizing a softmax temperature weighting to favor design variations with varied coordinate positioning of elements and varied fonts for text elements.

In a further example of an additional act not shown in FIG. 10, act(s) in the series of acts 1000 may include act of generating one or more iterations of digital design documents with one or more iterations of design variations by: translating a previously generated digital design document and corresponding design variation to a prior-iteration design language representation utilizing the language abstraction model; generating, from the prior-iteration design language representation, a subsequent design language representation of an additional design variation to the additional digital design document utilizing the generative language model; and generating a subsequent-iteration digital design document with the additional design variation from the subsequent design language representation.

Additionally, in another example of an additional act not shown in FIG. 10, act(s) in the series of acts 1000 may include act of: generating a design language representation vocabulary by utilizing a byte-pair encoding (BPE) tokenizer to tokenize template digital design documents from a template corpus; generating, for a training design document, a predicted token from the design language representation vocabulary; determining a measure of loss by comparing the predicted token and a ground truth token utilizing a loss function; and learning one or more parameters for the generative language model based on the measure of loss.

In yet another example of an additional act not shown in FIG. 10, act(s) in the series of acts 1000 may include act of: receiving a digital design document portraying a template background and one or more user interactions indicating at least one of an image, shape, or text to combine with the template background; translating the digital design document and the at least one of the image, the shape, or the text to a design language representation utilizing a language abstraction model; a step for generating an additional digital design document comprising a design variation corresponding to the at least one of the image, the shape, or the text from the design language representation; and providing the additional digital design document for display within a graphical user interface of a client device. In some embodiments, the design variation comprises a predicted attribute value for one or more attributes of frame, opacity, filter, blur, color, font, layout, or character count.

In a further example of an additional act not shown in FIG. 10, act(s) in the series of acts 1000 may include act of translating the digital design document and the at least one of the image, the shape, or the text to a design language representation by: identifying a background layer for the template background and one or more additional layers for the at least one of the image, the shape, or the text; and tokenizing, in order of layer positioning, elements of the background layer and the one or more additional layers.

In still another example of an additional act not shown in FIG. 10, act(s) in the series of acts 1000 may include act of translating the digital design document and the at least one of the image, the shape, or the text to a design language representation by generating a tokenized sentence comprising: a first token representing aspect ratio, size, or background information of the digital design document; and a second token representing attributes and attribute values for the at least one of the image, the shape, or the text.

The series of acts 1000 may also include receiving an additional user interaction indicating an additional design modification; and providing a further digital design document for display.

In addition (or in the alternative) to the acts described above, in some embodiments, the series of acts 1000 can include a step for generating an additional digital design document comprising a design variation corresponding to the at least one of the image, the shape, or the text from the design language representation. For instance, the acts and algorithms described above in relation to FIG. 3A-3B, 4, or 5 can comprise the corresponding acts (or structure) for a step for generating an additional digital design document comprising a design variation corresponding to the at least one of the image, the shape, or the text from the design language representation.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., memory), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed by a processor, cause a general-purpose computer, special purpose computer, or special purpose processing device to perform a certain function or group of functions. In some embodiments, computer-executable instructions are executed by a general-purpose computer to turn the general-purpose computer into a special purpose computer implementing elements of the disclosure. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. As used herein, the term "cloud computing" refers to a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In addition, as used herein, the term "cloud-computing environment" refers to an environment in which cloud computing is employed.

Figure 11:
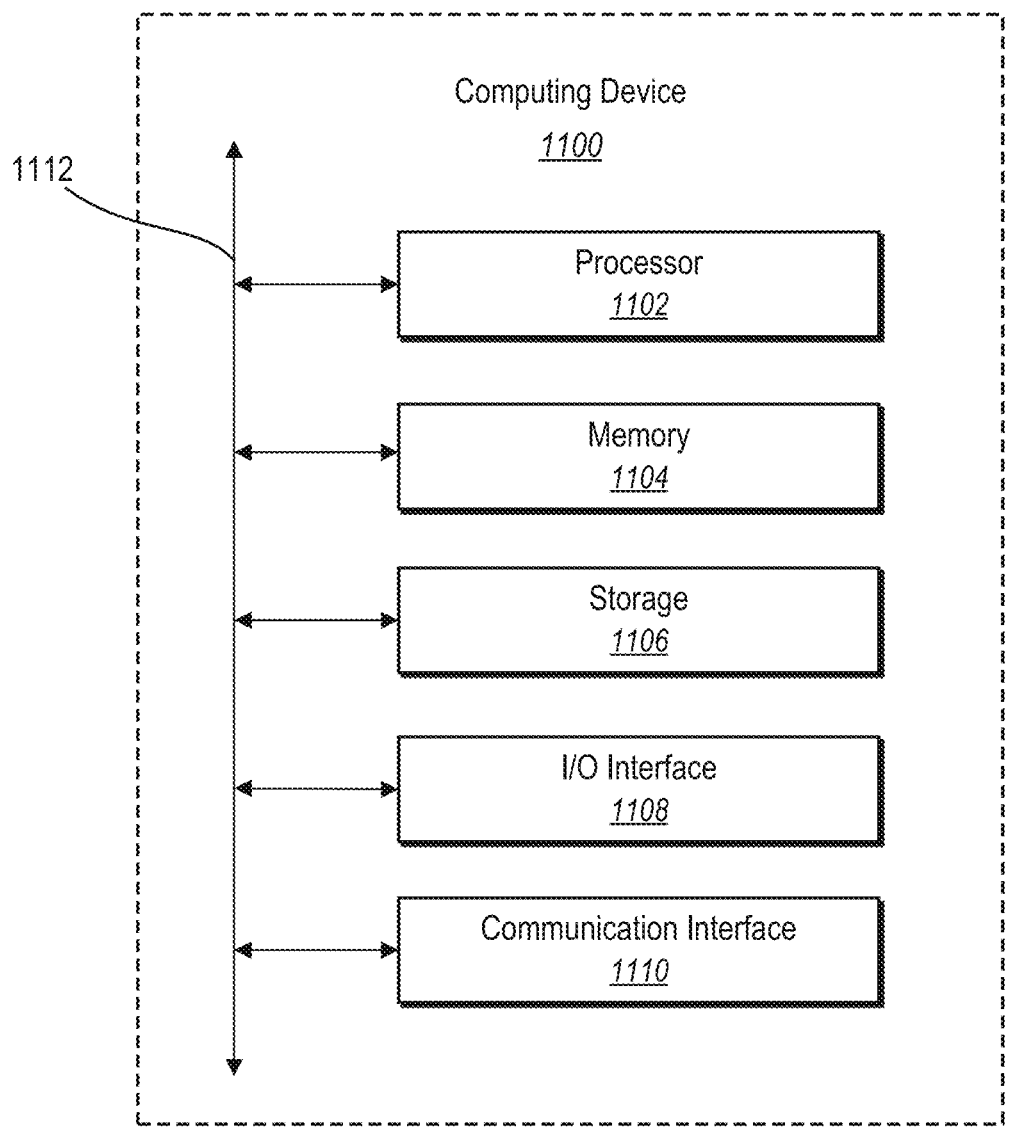
FIG. 11 illustrates a block diagram of an example computing device for implementing one or more embodiments of the present disclosure.

FIG. 11 illustrates a block diagram of an example computing device 1100 that may be configured to perform one or more of the processes described above. One will appreciate that one or more computing devices, such as the computing device 1100 may represent the computing devices described above (e.g., the server(s) 102, the client device 108, and/or the computing device 1000). In one or more embodiments, the computing device 1100 may be a mobile device (e.g., a mobile telephone, a smartphone, a PDA, a tablet, a laptop, a camera, a tracker, a watch, a wearable device, etc.). In some embodiments, the computing device 1100 may be a non-mobile device (e.g., a desktop computer or another type of client device). Further, the computing device 1100 may be a server device that includes cloud-based processing and storage capabilities.

As shown in FIG. 11, the computing device 1100 can include one or more processor(s) 1102, memory 1104, a storage device 1106, input/output interfaces 1108 (or "I/O interfaces 1108"), and a communication interface 1110, which may be communicatively coupled by way of a communication infrastructure (e.g., bus 1112). While the computing device 1100 is shown in FIG. 11, the components illustrated in FIG. 11 are not intended to be limiting. Additional or alternative components may be used in other embodiments. Furthermore, in certain embodiments, the computing device 1100 includes fewer components than those shown in FIG. 11. Components of the computing device 1100 shown in FIG. 11 will now be described in additional detail.

In particular embodiments, the processor(s) 1102 includes hardware for executing instructions, such as those making up a computer program. As an example, and not by way of limitation, to execute instructions, the processor(s) 1102 may retrieve (or fetch) the instructions from an internal register, an internal cache, memory 1104, or a storage device 1106 and decode and execute them.

The computing device 1100 includes memory 1104, which is coupled to the processor(s) 1102. The memory 1104 may be used for storing data, metadata, and programs for execution by the processor(s). The memory 1104 may include one or more of volatile and non-volatile memories, such as Random-Access Memory ("RAM"), Read-Only Memory ("ROM"), a solid-state disk ("SSD"), Flash, Phase Change Memory ("PCM"), or other types of data storage. The memory 1104 may be internal or distributed memory.

The computing device 1100 includes a storage device 1106 includes storage for storing data or instructions. As an example, and not by way of limitation, the storage device 1106 can include a non-transitory storage medium described above. The storage device 1106 may include a hard disk drive (HDD), flash memory, a Universal Serial Bus (USB) drive or a combination these or other storage devices.

As shown, the computing device 1100 includes one or more I/O interfaces 1108, which are provided to allow a user to provide input to (such as user strokes), receive output from, and otherwise transfer data to and from the computing device 1100. These I/O interfaces 1108 may include a mouse, keypad or a keyboard, a touch screen, camera, optical scanner, network interface, modem, other known I/O devices or a combination of such I/O interfaces 1108. The touch screen may be activated with a stylus or a finger.

The I/O interfaces 1108 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O interfaces 1108 are configured to provide graphical data to a display for presentation to a user. The graphical data may be representative of one or more graphical user interfaces and/or any other graphical content as may serve a particular implementation.

The computing device 1100 can further include a communication interface 1110. The communication interface 1110 can include hardware, software, or both. The communication interface 1110 provides one or more interfaces for communication (such as, for example, packet-based communication) between the computing device and one or more other computing devices or one or more networks. As an example, and not by way of limitation, communication interface 1110 may include a network interface controller (NIC) or network adapter for communicating with an Ethernet or other wire-based network or a wireless NIC (WNIC) or wireless adapter for communicating with a wireless network, such as a WI-FI. The computing device 1100 can further include a bus 1112. The bus 1112 can include hardware, software, or both that connects components of the computing device 1100 to each other.

In the foregoing specification, the invention has been described with reference to specific example embodiments thereof. Various embodiments and aspects of the invention(s) are described with reference to details discussed herein, and the accompanying drawings illustrate the various embodiments. The description above and drawings are illustrative of the invention and are not to be construed as limiting the invention. Numerous specific details are described to provide a thorough understanding of various embodiments of the present invention.

The present invention may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel to one another or in parallel to different instances of the same or similar steps/acts. The scope of the invention is, therefore, indicated by the appended claims rather than by the foregoing description. All changes that come within the meaning and range of equivalency of the claims are to be embraced within their scope.

What is claimed is:

1. A non-transitory computer-readable medium comprising instructions that, when executed by at least one processor, cause a computing device to perform operations comprising:
    translating a digital design document to a design language representation utilizing a language abstraction model;
    generating, from the design language representation, an additional design language representation of a design variation to the digital design document utilizing a generative language model; and
    generating an additional digital design document with the design variation from the additional design language representation.

2. The non-transitory computer-readable medium of claim 1, wherein translating the digital design document comprises utilizing the language abstraction model to translate the digital design document to a bounding box token, a background object token, or a background color token of the design language representation.

3. The non-transitory computer-readable medium of claim 1, wherein generating the additional design language representation of the design variation comprises utilizing the generative language model to generate one or more of an image token, a shape token, or a text token of the additional design language representation.

4. The non-transitory computer-readable medium of claim 1, further comprising instructions that, when executed by the at least one processor, cause the computing device to perform operations comprising:

receiving one or more user interactions indicating at least one of an image, shape, or text to add to the digital design document; and translating the at least one of the image, the shape, or the text to the design language representation utilizing the language abstraction model.

5. The non-transitory computer-readable medium of claim 4, wherein generating the additional design language representation of the design variation comprises utilizing the generative language model to predict, based on the design language representation, one or more attribute values for an attribute of the at least one of the image, the shape, or the text.

6. The non-transitory computer-readable medium of claim 5, wherein the attribute comprises:

an image attribute comprising at least one of a frame, opacity, filter, or blur;

a shape attribute comprising at least one of a frame, color, or opacity; or a text attribute comprising at least one of a character count, frame, font, layout, opacity, or color.

7. The non-transitory computer-readable medium of claim 1, further comprising instructions that, when executed by the at least one processor, cause the computing device to perform operations comprising:

translating the additional digital design document with the design variation to a further design language representation utilizing the language abstraction model;

generating, from the further design language representation, a subsequent design language representation of an additional design variation to the additional digital design document utilizing the generative language model; and generating a subsequent digital design document with the additional design variation from the subsequent design language representation.

8. The non-transitory computer-readable medium of claim 7, further comprising instructions that, when executed by the at least one processor, cause the computing device to perform operations comprising:

providing the additional digital design document for display within a graphical user interface of a client device; and in response to detecting a user interaction requesting the additional design variation to the additional digital design document, providing the subsequent digital design document for display within the graphical user interface of the client device.

9. A system comprising:

one or more memory devices comprising:

a digital design document portraying one or more digital design elements;

a language abstraction model; and a generative language model comprising a transformer neural network; and one or more processors configured to cause the system to:

translate, utilizing the language abstraction model, the digital design document to a design language representation comprising one or more of a bounding box token, a background object token, or a background color token;

generate, from the design language representation, an additional design language representation of a design variation to the one or more digital design elements utilizing the generative language model comprising the transformer neural network, the additional design language representation comprising one or more of an image token, a shape token, or a text token; and generate an additional digital design document with the design variation from the additional design language representation.

10. The system of claim 9, wherein the one or more digital design elements comprises an image background and at least one of text or a shape; and wherein translating the digital design document comprises utilizing the language abstraction model to tokenize the image background and at least one of the text or the shape into the design language representation.

11. The system of claim 9, wherein the one or more processors are configured to cause the system to translate the digital design document to the design language representation by utilizing the language abstraction model to:

generate the bounding box token by tokenizing bounding box data corresponding to copyspace detected in the digital design document;

generate the background object token by tokenizing background object data corresponding to at least one of a detected object with a human face or other detected object; or generate the background color token by tokenizing color data detected in the digital design document.

12. The system of claim 9, wherein the one or more processors are configured to cause the system to generate the additional design language representation of the design variation by utilizing the generative language model to generate at least one of:

a token for a suggested element to add to the digital design document, wherein the suggested element comprises an image, a shape, or text; or a token for a suggested attribute value for an attribute of either the suggested element or a user-requested element, the user-requested element comprising an image, a shape, or text indicated via a user interaction.

13. The system of claim 9, wherein the one or more processors are configured to cause the system to generate the additional design language representation of the design variation by utilizing the generative language model to predict, based on the design language representation, one or more attribute values for an attribute of at least one of an image, a shape, or text, wherein the attribute comprises:

an image attribute comprising at least one of a frame, opacity, filter, or blur;

a shape attribute comprising at least one of a frame, color, or opacity; and a text attribute comprising at least one of a character count, frame, font, layout, opacity, or color.

14. The system of claim 9, wherein the one or more processors are configured to cause the system to generate the additional design language representation of the design variation by utilizing a softmax temperature weighting to favor design variations with varied coordinate positioning of elements and varied fonts for text elements.

15. The system of claim 9, wherein the one or more processors are configured to cause the system to generate one or more iterations of digital design documents with one or more iterations of design variations by:

translating a previously generated digital design document and corresponding design variation to a prior-iteration design language representation utilizing the language abstraction model;

generating, from the prior-iteration design language representation, a subsequent design language representation of an additional design variation to the additional digital design document utilizing the generative language model; and generating a subsequent-iteration digital design document with the additional design variation from the subsequent design language representation.

16. The system of claim 9, wherein the one or more processors are configured to cause the system to:

generate a design language representation vocabulary by utilizing a byte-pair encoding (BPE) tokenizer to tokenize template digital design documents from a template corpus;

generate, for a training design document, a predicted token from the design language representation vocabulary;

determine a measure of loss by comparing the predicted token and a ground truth token utilizing a loss function; and learn one or more parameters for the generative language model based on the measure of loss.

17. A computer-implemented method comprising:

receiving a digital design document and one or more user interactions indicating at least one of an image, shape, or text;

translating the digital design document and the at least one of the image, the shape, or the text to a design language representation utilizing a language abstraction model;

a step for generating an additional digital design document comprising a design variation corresponding to the at least one of the image, the shape, or the text from the design language representation; and providing the additional digital design document for display within a graphical user interface of a client device.

18. The computer-implemented method of claim 17, further comprising:

receiving an additional user interaction indicating an additional design modification; and providing a further digital design document for display.

19. The computer-implemented method of claim 17, wherein translating the digital design document and the at least one of the image, the shape, or the text to a design language representation comprises generating a tokenized sentence comprising:

a first token representing aspect ratio, size, or background information of the digital design document; and a second token representing attributes and attribute values for the at least one of the image, the shape, or the text.

20. The computer-implemented method of claim 17, wherein the design variation comprises a predicted attribute value for one or more attributes of frame, opacity, filter, blur, color, font, layout, or character count.

* * * * *